United States Patent
Li et al.

(10) Patent No.: US 11,324,044 B2
(45) Date of Patent: May 3, 2022

(54) ACCESS METHOD AND APPARATUS

(71) Applicant: HUAWEI TECHNOLOGIES CO., LTD., Guangdong (CN)

(72) Inventors: Yanchun Li, Shenzhen (CN); Yuchen Guo, Shenzhen (CN); Yunbo Li, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/371,787

(22) Filed: Apr. 1, 2019

(65) Prior Publication Data

US 2019/0230709 A1 Jul. 25, 2019

Related U.S. Application Data

(63) Continuation of application No. 16/017,021, filed on Jun. 25, 2018, which is a continuation of application No. PCT/CN2016/105514, filed on Nov. 11, 2016.

(30) Foreign Application Priority Data

Dec. 25, 2015 (CN) .......................... 201510993268.4

(51) Int. Cl.
*H04W 74/08* (2009.01)
*H04W 4/00* (2018.01)
(Continued)

(52) U.S. Cl.
CPC ....... *H04W 74/0816* (2013.01); *H04L 5/0094* (2013.01); *H04W 4/00* (2013.01);
(Continued)

(58) Field of Classification Search
CPC . H04W 74/0816; H04W 4/00; H04W 74/008; H04W 72/087; H04W 28/06;
(Continued)

(56) References Cited

U.S. PATENT DOCUMENTS 7,161,951 B1 1/2007 Sherman
10,154,520 B1 12/2018 Hedayat et al.
(Continued)

FOREIGN PATENT DOCUMENTS

CN 1663213 8/2005
CN 102752875 10/2012
(Continued)

OTHER PUBLICATIONS

Yang et al., "Uplink multi-users data transmission method and uplink multi-users input-output system", Oct. 2, 2018, CN, CN 104253673, English machine language translation. (Year: 2018).*
(Continued)

*Primary Examiner* — Michael K Phillips
(74) *Attorney, Agent, or Firm* — Fish & Richardson P.C.

(57) ABSTRACT

Embodiments of the present invention provide an access method, including: sending, to an access point, a first frame that carries uplink transmission requirement information; and if a second frame that carries information about an uplink transmission resource is received from the access point within agreed time period, sending uplink multi-user transmission data to the access point, where the uplink multi-user transmission data is transmitted on the uplink transmission resource; or if the second frame is not received within an agreed time period, accessing, by a station, a channel in a contention access manner that is based on carrier sense CSMA/CA. According to the method provided in the embodiments of the present invention, a channel access manner can be managed, a congestion degree of a system can be decreased, and channel utilization can be increased.

20 Claims, 17 Drawing Sheets

(51) Int. Cl.
*H04L 5/00* (2006.01)
*H04W 28/06* (2009.01)
*H04W 72/08* (2009.01)
*H04W 72/12* (2009.01)
*H04W 74/00* (2009.01)
*H04W 72/04* (2009.01)

(52) U.S. Cl.
CPC ......... *H04W 28/06* (2013.01); *H04W 72/087* (2013.01); *H04W 72/1268* (2013.01); *H04W 74/008* (2013.01); *H04W 72/0446* (2013.01)

(58) Field of Classification Search
CPC ......... H04W 72/1268; H04W 72/0446; H04W 84/12; H04W 74/006; H04W 72/12; H04W 74/002; H04W 48/16; H04W 72/04; H04L 5/0094; H04L 5/0053
See application file for complete search history.

(56) References Cited

U.S. PATENT DOCUMENTS

| | | | |
|---|---|---|---|
| 2004/0001429 A1 | 1/2004 | Ma et al. | |
| 2005/0152373 A1 | 7/2005 | Ali | |
| 2005/0207377 A1 | 9/2005 | Kwon et al. | |
| 2006/0045059 A1* | 3/2006 | Yun | H04W 74/04 370/338 |
| 2006/0120339 A1 | 6/2006 | Akiyama et al. | |
| 2006/0215686 A1 | 9/2006 | Takeuchi | |
| 2006/0225089 A1 | 10/2006 | Ikeda | |
| 2008/0095124 A1 | 4/2008 | Ramos et al. | |
| 2008/0101231 A1 | 5/2008 | Lai et al. | |
| 2008/0240049 A1 | 10/2008 | Gaur | |
| 2009/0262671 A1* | 10/2009 | Seol | H04W 72/0413 370/281 |
| 2010/0293286 A1 | 11/2010 | Nikkil et al. | |
| 2012/0218961 A1 | 8/2012 | Goto et al. | |
| 2012/0230200 A1* | 9/2012 | Wentink | H04L 1/1825 370/241 |
| 2013/0279427 A1* | 10/2013 | Wentink | H04W 28/18 370/329 |
| 2014/0079046 A1 | 3/2014 | Yang et al. | |
| 2014/0169290 A1 | 6/2014 | Seok | |
| 2015/0117363 A1* | 4/2015 | Rong | H04B 7/0452 370/329 |
| 2015/0181589 A1* | 6/2015 | Luo | H04B 7/0452 370/329 |
| 2015/0189673 A1 | 7/2015 | Park et al. | |
| 2015/0264710 A1* | 9/2015 | Kneckt | H04W 72/0446 370/336 |
| 2015/0281980 A1 | 10/2015 | Zhou et al. | |
| 2015/0319609 A1* | 11/2015 | Asterjadhi | H04W 74/006 370/328 |
| 2015/0334592 A1* | 11/2015 | Choi | H04W 52/0216 370/311 |
| 2016/0128024 A1 | 5/2016 | Frederiks et al. | |
| 2016/0156497 A1 | 6/2016 | Xun et al. | |
| 2016/0192377 A1* | 6/2016 | Zhou | H04W 74/0816 370/329 |
| 2016/0198500 A1 | 7/2016 | Merlin et al. | |
| 2016/0255656 A1 | 9/2016 | Lou et al. | |
| 2016/0323807 A1 | 11/2016 | Ghosh et al. | |
| 2016/0330765 A1* | 11/2016 | Levy | H04W 74/04 |
| 2017/0026151 A1* | 1/2017 | Adachi | H04W 72/005 |
| 2017/0055290 A1 | 2/2017 | Lv et al. | |
| 2017/0273140 A1* | 9/2017 | Ryu | H04W 84/12 |
| 2017/0325266 A1 | 11/2017 | Kim et al. | |
| 2018/0092032 A1* | 3/2018 | Choi | H04L 27/26 |
| 2018/0132278 A1* | 5/2018 | Oteri | H04W 74/0808 |
| 2018/0139699 A1* | 5/2018 | Choi | H04W 48/02 |
| 2018/0184453 A1 | 6/2018 | Viger et al. | |
| 2018/0191541 A1* | 7/2018 | Fang | H04L 27/26 |
| 2018/0199375 A1* | 7/2018 | Nezou | H04W 74/0816 |
| 2018/0242355 A1* | 8/2018 | Lou | H04W 72/121 |
| 2018/0279369 A1 | 9/2018 | Xing et al. | |
| 2018/0310338 A1* | 10/2018 | Li | H04L 5/0094 |
| 2018/0317242 A1 | 11/2018 | Park et al. | |
| 2020/0084716 A1* | 3/2020 | Choi | H04W 52/0216 |

FOREIGN PATENT DOCUMENTS

| | | | |
|---|---|---|---|
| CN | 103313422 | 9/2013 | |
| CN | 103476130 | 12/2013 | |
| CN | 103491597 | 1/2014 | |
| CN | 104113902 A | 10/2014 | |
| CN | 104244331 A | 12/2014 | |
| CN | 104253673 | 12/2014 | |
| CN | 104640229 A | 5/2015 | |
| CN | 104967671 A | 10/2015 | |
| EP | 1248476 | 10/2002 | |
| EP | 1248476 A1 * | 10/2002 | ........ H04W 72/1289 |
| GB | 2443862 A | 5/2008 | |
| JP | 2006279851 A | 10/2006 | |
| JP | 2012235453 A | 11/2012 | |
| JP | 2015050650 A | 3/2015 | |
| JP | 2018509024 A | 3/2018 | |
| KR | 20110058712 A | 6/2011 | |
| KR | 20150000489 A | 1/2015 | |
| KR | 20150020284 A | 2/2015 | |
| KR | 20150138159 A | 12/2015 | |
| WO | WO-2014206102 A1 * | 12/2014 | .......... H04W 74/006 |
| WO | 2015179749 | 11/2015 | |
| WO | 2015194727 | 12/2015 | |
| WO | 2015194727 A1 | 12/2015 | |
| WO | 2017044529 A1 | 3/2017 | |

OTHER PUBLICATIONS

Choi et al.; "A Real-Time Updating Algorithm of RTS-CTS Threshold to Enhance EDCA MAC Performance in IEEE 802.11e Wireless LANS", Sep. 26-29, 2004, IEEE, IEEE 60th Vehicular Technology Conference 2004, VTC2004—Fall 2004, pp. 4801-4804. (Year: 2004).*

Chinese Office Action issued in Chinese Application No. 201810864702.2 dated Mar. 27, 2019, 5 pages.

Chinese Search Report issued in Chinese Application No. 2018108647022 dated Mar. 14, 2019, 2 pages.

Extended European Search Report issued in European Application No. 16877510.4 dated Apr. 4, 2019, 7 pages.

IEEE P802.11ax™/D1 .0,""Part 11: Wireless LAN Medium Access Control (MAC) and Physical Layer (PHY) Specifications"".dated Nov. 2016,total 453 pages.

IEEE P802.11-REVmc/D2. 7 ,""Part 11: Wireless LAN Medium Access Control(MAC) and Physical Layer (PHY) Specifications"",dated Apr. 2014,total 3741 pages.

IEEE P802.11-REVmcTM/D2.0,Part 11: Wireless LAN Medium Access Control(MAC) and Physical Layer (PHY) Specifications,IEEE Computer Society,dated Oct. 2013,total 3237 pages.

International Search Report and Written Opinion issued in PCT/CN2016/105514 dated Feb. 14, 2017, 12 pages.

Vanchun Li et al.,""Channel Access Policy for 11ax"",20151220r2 Huawei Channel Access Policy for 11ax,dated Dec. 20, 2015,total 15 pages.

Office Action issued in Japanese Application No. 2018-533608 dated May 14, 2019, 6 pages (with English translation).

Notice of References Cited (PTO-892) issued in U.S. Appl. No. 16/017,021 dated Jun. 13, 2019, 1 page.

Office Action issued in European Application No. 16877510.4 dated Nov. 29, 2019, 4 pages.

Office Action issued in Japanese Application No. 2018/533,608 dated Nov. 26, 2019, 8 pages (With English Translation).

Office Action issued in Korean Application No. 2020-7014281 dated May 28, 2020, 8 pages (with English translation).

IEEE 802:"IEEE 802 submission to 3GPP LAA Workshop on Aug. 29, 2015 in Beijing, China", LAA-150003, IEEE 802.19-15/0069r7,Aug. 17, 2015, total 53 pages.

Office Action issued in Chinese Application No. 201910276695.9 dated Mar. 13, 2020, 7 pages.

(56) References Cited

OTHER PUBLICATIONS

Office Action issued in Indian Application No. 201847026864 dated Sep. 11, 2020, 8 pages.
Office Action issued in Korean Application No. 2020-7014281 dated Sep. 14, 2020, 7 pages (with English translation).
Kishida et al., "User-Oriented QoS Control Method Based on CSMA/CA for IEEE802.11 Wireless LAN System," IEICE Transactions on Communications, vol. E96-B, No. 2, Feb. 2013, 11 pages.
Fang et al., "Energy-Efficient Cooperation Communication for Data Transmission in Wireless Sensor Networks," IEEE Transactions on Consumer Electronics, vol. 56, No. 4, Nov. 2010, 8 pages.
Office Action issued in Japanese Application No. 2020-113875 dated Aug. 31, 2021, 9 pages (with English translation).
Office Action issued in Japanese Application No. 2020-113875 dated Jan. 18, 2022, 11 pages (with English translation).

\* cited by examiner

ACCESS METHOD AND APPARATUS

CROSS-REFERENCE TO RELATED APPLICATIONS

This application is a continuation of U.S. patent application Ser. No. 16/017,021, filed on Jun. 25, 2018, which is a continuation of International Application No. PCT/CN2016/105514, filed on Nov. 11, 2016, which claims priority to Chinese Patent Application No. 201510993268.4, filed on Dec. 25, 2015, All of the afore-mentioned patent applications are hereby incorporated by reference in their entireties.

TECHNICAL FIELD

The present invention relates to the field of wireless communications technologies, and in particular, to an access method and apparatus.

BACKGROUND

To resolve a WLAN quality of service (Quality of Service, QoS) problem, the Institute of Electrical and Electronics Engineers (Institute of Electrical and Electronics Engineers, IEEE) introduces the IEEE802.11e standard.

The IEEE802.11e extends a distributed coordination function (Distributed Coordination Function, DCF) channel access mechanism at a Media Access Control (Medium Access Control, MAC) layer of the original IEEE802.11, to form enhanced distributed channel access (Enhanced Distributed Channel Access, EDCA). The EDCA enhances the DCF mechanism, distinguishes between priorities of different service applications, guarantees a channel access capability of a high-priority service, and guarantees bandwidth of the high-priority service to some extent.

In the 802.11e protocol, there are four AC (Access Category, access category) queues, including AC_BK (Background traffic), AC_BE (Best Effort traffic), AC_VI (Video traffic), and AC_VO (Voice Traffic), and different EDCA parameters may be configured, so that a high-priority AC queue has more sending opportunities and less waiting time. In the protocol, an ACI (Access Category Index, access category index) is used to identify the foregoing access category. A queue is selected according to a priority carried in a data frame, so as to ensure QoS in a wireless local area network environment.

An access point (Access Point, AP) may add information about an EDCA parameter set to a beacon frame (Beacon Frame), a probe (Probe) response frame, an association response frame, or a re-association response frame, and the parameter set indicates parameters of EDCA channel access manners of different access categories (Access Category), including an AIFSN, ACM, an ACI, an ECWmin, an ECWmax, and a TXOP Limit.

A larger value of the AIFSN (Arbitration Inter Frame Spacing Number, arbitration interframe spacing number) indicates longer idle waiting time of a user.

The ECWmin (Exponent form of CWmin, Exponent form of Cwmin) and the ECWmax (Exponent form of CWmax, Exponent form of Cwmax) determine an average backoff time value, and larger values of the two parameters indicate a longer average backoff time of the user.

The TXOP Limit (Transmission Opportunity Limit, transmission opportunity limit) indicates maximum duration for occupying a channel after contention of the user succeeds once. A larger value of the TXOP Limit indicates longer duration for occupying a channel by the user once. If the value is 0, only one packet can be sent each time after a channel is occupied, and a channel needs to be contended for again for sending a packet again.

The ACM (Admission Control Mandatory, admission control mandatory) indicates whether an access category needs admission control. If a bit is 0, a corresponding access category does not need admission control. If the bit is 1, admission control needs to be used before an access parameter of the access category is used for transmission.

In a current application, four EDCA parameter sets are configured by default to separately correspond to different queues, and each parameter set takes effect on an entire BSS (Basic Service Set, basic service set). That is, in the BSS, QoS characteristics of all STAs are consistent, and if two STAs transmit data of a same queue, the STAs use a same EDCA parameter.

In an existing application, a STA can perform random access based on a time domain only on a main channel, and therefore random access efficiency is relatively low. In uplink multi-user transmission, multiple stations can perform parallel random access on multiple channels at the same time, to improve the random access efficiency. However, in this access manner, multi-user transmission needs to be organized after an AP successfully obtains a channel by means of contention, and a probability that an AP successfully obtains a channel by means of contention needs to be increased.

SUMMARY

Embodiments of the present invention provide an access method and apparatus, so as to enable, as far as possible, multiple stations to perform parallel random access on multiple channels at the same time, and improve random access efficiency. To achieve the foregoing objective, the following technical solutions are used in the embodiments of the present invention.

According to a first aspect, an embodiment of the present invention provides an access method, including:

sending, to an access point, a first frame that carries uplink transmission requirement information; and if a second frame that carries information about an uplink transmission resource is received from the access point within an agreed time period, sending uplink multi-user transmission data to the access point, where the uplink multi-user transmission data is transmitted on the uplink transmission resource; or if the second frame is not received within an agreed time period, accessing, by a station, a channel in a contention access manner that is based on carrier sense CSMA/CA.

With reference to the first aspect, in a first implementation of the first aspect, the access method further includes: receiving a radio frame sent by the access point, where the radio frame indicates sending time (or may be referred to as target sending time, that is, a preset sending time point of the second frame) of the second frame, and the radio frame is an association response frame, a beacon frame, or a response frame of the access point to a received data frame. Further, the agreed time period may be obtained according to the sending time point of the second frame.

According to a second aspect, an embodiment of the present invention provides an access method, including:

receiving a radio frame sent by an access point, where the radio frame indicates an access manner for performing channel access, and the radio frame is an association response frame, a beacon frame, or a response frame of the access point to a received data frame; and if a second frame that carries information about an uplink transmission resource is received from the access point within an agreed time period, sending uplink multi-user transmission data to the access point, where the uplink multi-user transmission data is transmitted on the uplink transmission resource; or if the second frame is not received within an agreed time period, accessing, by a station, a channel in a CSMA/CA-based contention access manner.

With reference to the second aspect, in a first implementation of the second aspect, the access manner includes at least one of the following: the contention access manner that is based on carrier sense multiple access with collision avoidance CSMA/CA, a contention access manner that is based on orthogonal frequency division multiple access OFDMA, or an OFDMA-based scheduling access manner.

With reference to the second aspect or the first implementation of the second aspect, in a third implementation of the second aspect, the second frame or the radio frame further includes indication information that indicates the following or the following is agreed in advance in a protocol:

when the data frame carries a buffer status report BSR or the data frame does not include an unfragmented data frame, the data frame is sent in the OFDMA contention access manner.

According to a third aspect, an embodiment of the present invention provides an access method, including:

receiving, from an access point, a first frame that carries information about an uplink transmission resource;

sending, to the access point, a second frame that carries uplink transmission requirement information, and disabling a CSMA/CA-based contention access manner or disabling a backoff timer; and if a third frame that carries information about an uplink transmission resource is received from the access point within an agreed time period, sending uplink multi-user transmission data to the access point, where the uplink multi-user transmission data is transmitted on the uplink transmission resource; or if the third frame is not received within an agreed time period, accessing, by a station, a channel by enabling the CSMA/CA-based contention access manner.

When there are many connected stations, a large quantity of stations may participate in CSMA/CA contention and OFDMA contention. Consequently, a probability of a collision between stations is greatly increased, and channel utilization is decreased. Therefore, according to the access method provided in this embodiment of the present invention, a channel access manner can be managed, a congestion degree of a system can be decreased, and the channel utilization can be increased.

Optionally, in this embodiment of the present invention, the agreed time period may be counted by using a timer, where an initial value of the timer is specified by the access point or is agreed in a protocol. Further, when a channel on which the uplink transmission resource is located is idle, a value of the timer progressively decreases with time; or when the channel is busy, progressive decreasing of a value of the timer is suspended. Still further, the value of the timer is updated when the channel is busy or a trigger frame that carries information about an uplink transmission resource is received or a trigger frame for random access is received or a trigger frame that carries a training sequence is received, and a manner of updating the value of the timer is adding a constant to or multiplying a constant by a current value of the timer.

Optionally, the uplink transmission requirement information includes at least one of the following: a packet arrival interval, packet size information, or traffic rate information.

Corresponding to the method provided above, the embodiments of the present invention further provide a corresponding method on an access point side.

According to a fourth aspect, an embodiment of the present invention provides an access method, including:

receiving, from a station, a first frame that carries uplink transmission requirement information;

sending, to the station, a second frame that carries information about an uplink transmission resource; and receiving uplink multi-user transmission data from the station, where the uplink multi-user transmission data is transmitted on the uplink transmission resource.

According to a fifth aspect, an embodiment of the present invention provides an access method, including:

sending a radio frame to a station, wherein the radio frame indicates an access manner (for example, whether to use an OFDMA-based access manner or whether to disable a CSMA/CA-based contention access manner) for performing channel access, and the radio frame is an association response frame, a beacon frame, or a response frame of the access point to a received data frame;

sending, to the station, a second frame that carries information about an uplink transmission resource; and receiving uplink multi-user transmission data from the station, where the uplink multi-user transmission data is transmitted on the uplink transmission resource.

In the fifth aspect, the access point may indicate, according to scenario information by using the radio frame, the access manner for performing channel access. For example, in an intensive deployment (coverage areas of many stations or access points are heavily overlapped) scenario, an access point may instruct a station to disable the CSMA/CA-based contention access manner. The access point may instruct the station to use the OFDMA-based access manner. A contention collision between stations can be reduced, and a throughput rate of an entire system can be improved. Otherwise, in a scenario with few stations, an access point may instruct a station to enable the CSMA/CA-based contention access manner. The access point controls the access manner of the station, and system resources can be effectively used.

According to a sixth aspect, an embodiment of the present invention provides an access method, including:

sending, to a station, a first frame that carries information about an uplink transmission resource;

receiving, from the station, a second frame that carries uplink transmission requirement information;

sending, to the station, a third frame (such as a trigger frame) that carries information about an uplink transmission resource; and receiving uplink multi-user transmission data from the station, where the uplink multi-user transmission data is transmitted on the uplink transmission resource.

It should be noted that in the sixth aspect, the information about the uplink transmission resource in the third frame may further include an identifier of one or more stations that use the uplink transmission resource.

Corresponding to the method provided above, the embodiments of the present invention further provide a corresponding apparatus.

According to a seventh aspect, an embodiment of the present invention provides an access apparatus, including:

a sending module, configured to send, to an access point, a first frame that carries uplink transmission requirement information; and a processing module, configured to: if a second frame that carries information about an uplink transmission resource is received from the access point within an agreed time period, send uplink multi-user transmission data to the access point, where the uplink multi-user transmission data is transmitted on the uplink transmission resource; or if the second frame is not received within an agreed time period, access, by a station, a channel in a contention access manner that is based on carrier sense CSMA/CA.

According to an eighth aspect, an embodiment of the present invention provides an access apparatus, including:

a receiving module, configured to receive, from a station, a first frame that carries uplink transmission requirement information; and a sending module, configured to send, to the station, a second frame that carries information about an uplink transmission resource, where the receiving module is further configured to receive uplink multi-user transmission data from the station, where the uplink multi-user transmission data is transmitted on the uplink transmission resource.

The sending module is further configured to send the second frame to one or more stations, where the second frame indicates the one or more stations to perform uplink multi-user transmission, and the one or more stations include the station that sends the first frame.

The following provides some apparatuses corresponding to the methods by using only a station side as an example. The apparatus on the access point side may be provided in a similar manner, and details are not described herein.

According to a ninth aspect, an embodiment of the present invention provides an access apparatus, including:

a receiving module, configured to receive a radio frame sent by an access point, where the radio frame indicates an access manner for performing channel access, and the radio frame is an association response frame, a beacon frame, or a response frame of the access point to a received data frame; and a processing module, configured to: if a second frame that carries information about an uplink transmission resource is received from the access point within an agreed time period, send uplink multi-user transmission data to the access point, where the uplink multi-user transmission data is transmitted on the uplink transmission resource; or if the second frame is not received within an agreed time period, access, by a station, a channel in a CSMA/CA-based contention access manner.

According to a tenth aspect, an embodiment of the present invention provides an access apparatus, including:

a receiving module, configured to receive, from an access point, a first frame that carries information about an uplink transmission resource;

a sending module, configured to send, to the access point, a second frame that carries uplink transmission requirement information; and a processing module, configured to: disable a CSMA/CA-based contention access manner or disable a backoff timer; and if a third frame that carries information about an uplink transmission resource is received from the access point within an agreed time period, send uplink multi-user transmission data to the access point, where the uplink multi-user transmission data is transmitted on the uplink transmission resource; or if the third frame is not received within an agreed time period, access, by a station, a channel by enabling the CSMA/CA-based contention access manner.

Some technical features in the foregoing apparatus embodiments, such as the timer, the uplink transmission resource, the trigger frame, and the radio frame, are similar or corresponding to some technical features in the foregoing method embodiments, and no repeated descriptions are given herein.

According to the embodiments of the present invention, multiple stations are enabled, as far as possible, to perform parallel random access on multiple channels at the same time, and random access efficiency is improved. There are two manners for increasing an opportunity that the access point obtains a channel. One is that the station delays contention or decreases intensity of contending for a channel by the station, and the other is that after obtaining a channel by means of contention, the station hands over a control right to the access point, and the access point sends a multi-user transmission trigger frame.

BRIEF DESCRIPTION OF DRAWINGS

Accompanying drawings are included and constitute a part of the specification, and a same number describes a same component. The accompanying drawings describe embodiments of the present invention and are intended to, together with the described content, explain principles of the present invention.

FIG. 3G-1 and FIG. 3G-2 are schematic diagrams in which multiple transmission manners jointly work;

DESCRIPTION OF EMBODIMENTS

Figure 1:
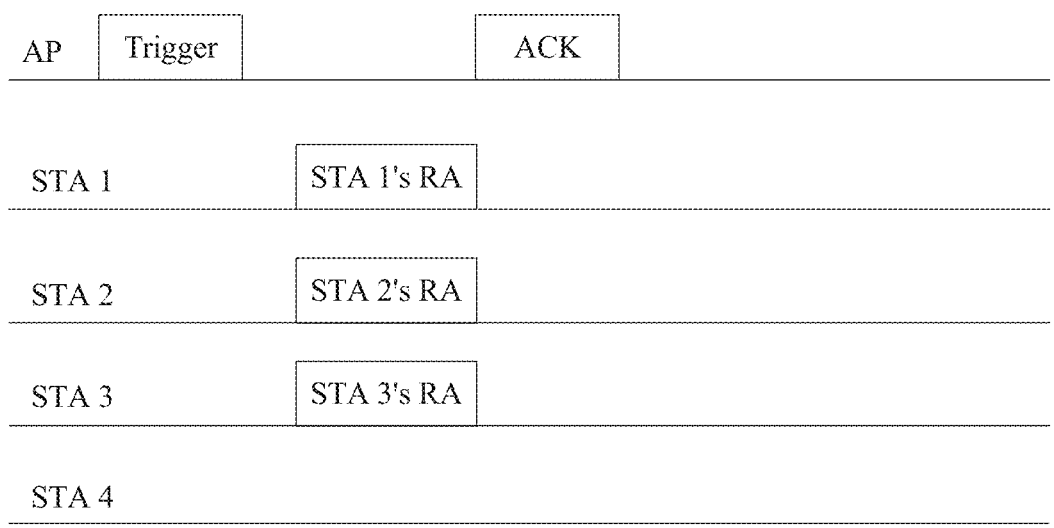
FIG. 1 is a schematic flowchart of a frame exchange of STA random access.

Various embodiments of the present invention are referenced in detail, and an example is shown in the accompanying drawings. Although descriptions are provided with reference to these embodiments, it may be understood that these embodiments are not used to limit the present invention to these embodiments. Instead, the present invention is intended to cover a replacement technology, modification, and an equivalent technology that may be included within the spirit and scope of the present invention limited in the appended claims. In addition, in the following detailed descriptions of the present invention, many specific details are described to provide a thorough understanding of the present invention. However, it may be understood that in an actual application, these specific details of the present invention may not be included. A well-known method, process, component, and circuit are not described in detail in another example, so as to prevent various aspects of the present invention from being unnecessarily blurred.

In an IEEE 802.11ax system, a station (English: station, STA for short) performs uplink access mainly in the following several manners:

Manner 1: a contention access manner that is based on carrier sense multiple access with collision avoidance (English: Carrier Sense Multiple Access with Collision Avoidance, CSMA/CA for short).

Manner 2: a contention access manner that is based on orthogonal frequency division multiple access (English: Orthogonal Frequency Division Multiple Access, OFDMA for short).

Manner 3: an OFDMA-based scheduling access manner.

In the foregoing manner 1, a STA may spontaneously perform access by means of carrier sense when a channel is idle. In the foregoing manner 2, after receiving a trigger frame for random access (English: trigger frame for random access, TFR for short) sent by an AP, a STA may randomly select a resource block to perform access. In the foregoing manner 3, after receiving a trigger frame (English: trigger frame) sent by an AP, a STA may perform data transmission on a corresponding channel according to an indication of the trigger frame. To enable an AP to send a trigger frame to a STA, the STA needs to send a buffer size report (English: Buffer Size Report, BSR for short) to the AP, and the BSR may be sent in the foregoing manner 1, manner 2, or another manner.

The OFDMA-based scheduling access manner may further be implemented by using another access method. For example, a STA may send a radio frame to an AP in the manner 1 or the manner 2, and the radio frame carries indication information that is used to indicate that the AP may send a trigger frame to trigger the STA to send uplink data (and may further trigger another STA to send uplink data).

If each STA is allowed to perform data transmission in all of the foregoing three manners, when there are many STAs, a large quantity of users may participate in CSMA/CA contention or OFDMA contention, a probability of a collision between users is greatly increased, and channel utilization is decreased. Embodiments of the present invention provide a channel access manner management mechanism, so as to decrease a congestion degree of a system and improve the channel utilization.

Embodiment 1: Multi-User Transmission Framework

When multiple users perform random access, an AP needs to provide a trigger frame, to ensure that signals of the multiple users reach the AP in an aligned manner. A basic process is as follows:

Step 1: The AP sends a trigger frame, and the trigger frame is used to trigger a station to perform OFDMA-based random access.

Step 2: The station determines, according to a sending condition, whether to send a random access packet. If the station determines to send a random access packet, the station sends the random access packet in a specified time after receiving the trigger frame.

The sending condition may be one or more of the following:

(1) The station generates a random backoff number (random backoff number) within a contention window range for a to-be-sent packet, and the station updates the random backoff number according to a quantity of resources for random access that are included in the trigger frame, and determines to send the random access packet if backoff is completed. Updating the random backoff number includes: a new random backoff number=an original random backoff number−the quantity of resources for random access. If the random backoff number reaches 0, backoff is completed.

(2) The station generates a random backoff number (random backoff number) within a contention window range for a to-be-sent packet, and the station updates the random backoff number according to an access condition included in the trigger frame and a quantity of resources for random access that are corresponding to the access condition and that are included in the trigger frame, and determines to send the random access packet if backoff is completed. Updating includes: a new random backoff number=an original random backoff number−the quantity of resources for random access. If the random backoff number reaches 0, backoff is completed.

The sending condition may include a requirement for a type (an association request, a buffer size report (Buffer Size Report), an idle/available channel report, a channel status report, or a channel quality/signal to interference plus noise ratio report) of the random access packet of the station, and/or a requirement for a service type of the random access packet.

The sending condition may further include whether the station needs to determine, when performing access, whether a channel is busy or idle. The station accesses a channel only when the channel is idle or the station updates the random backoff number only when a channel is idle.

It should be noted that a packet and a frame in the embodiments of the present invention may be interchangeably used unless otherwise specified.

Step 3: The AP sends an acknowledgement frame after receiving a random access packet of one or more stations. The acknowledgement frame includes acknowledgement indication information about that the AP successfully receives the random access packet.

Step 4: The station receives the acknowledgement frame, and learns, according to the acknowledgement indication information, whether the random access packet sent by the station is successfully received by the AP.

During implementation, the AP may also be a common station in a network.

Figure 2:
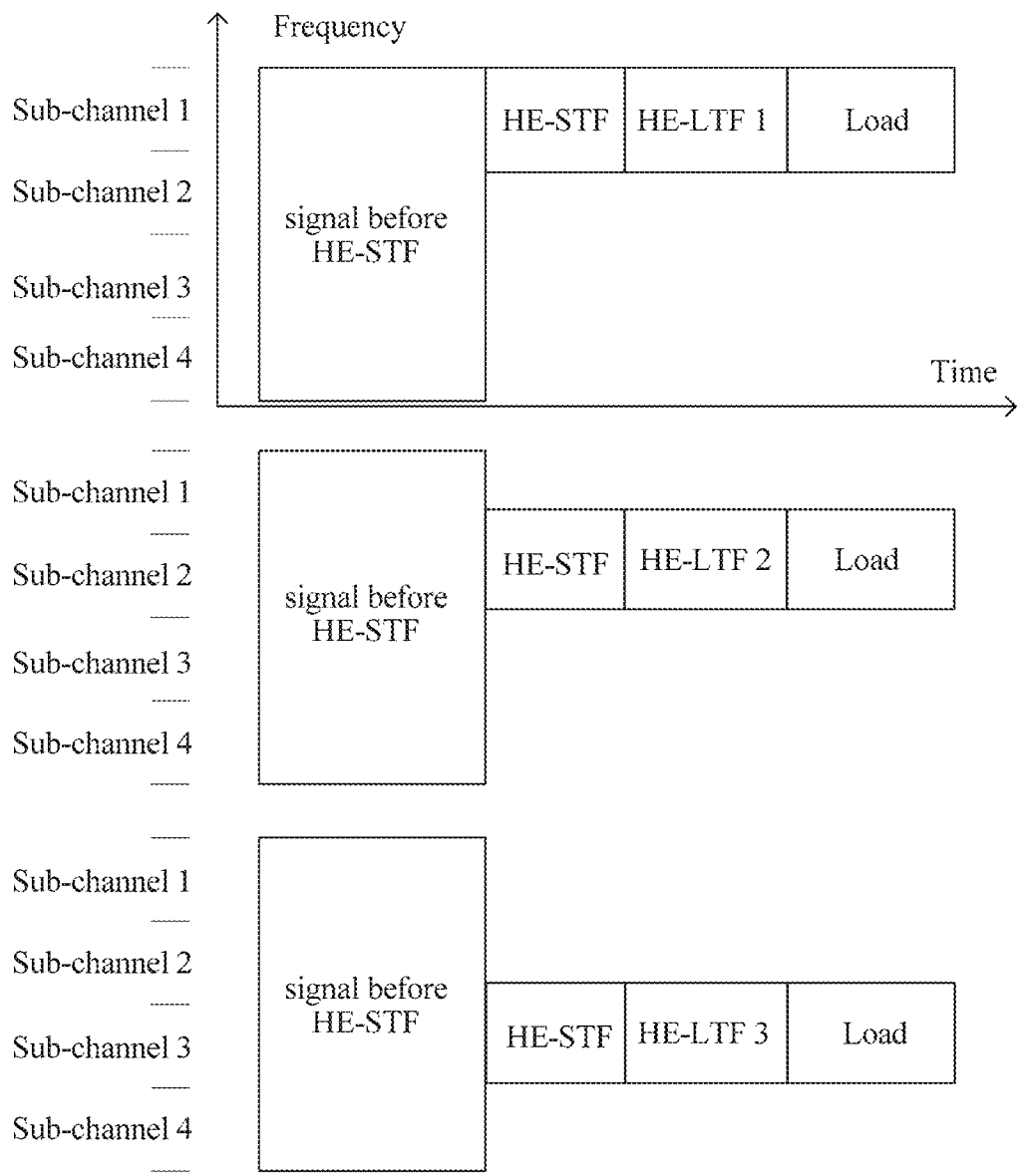
FIG. 2 is a schematic diagram of a basic structure of an uplink random access packet.

FIG. 1 is a schematic flowchart of a frame exchange of STA random access. In this process, if a quantity of stations that meet the sending condition is greater than one, the stations may send the random access packet (such as a packet sent by a STA 1, a STA 2, or a STA 3 in FIG. 1) in parallel. FIG. 2 is a schematic diagram of a basic structure of an uplink random access packet. When the OFDMA-based access manner is used, a specific format of the random access packet sent by the station is shown in FIG. 2. A signal (such as an L-STF (Legacy Short Training Field, legacy short training field) before high efficiency-short training field (English: High Efficient-Short Training Field, HE-STF for short), an L-LTF (Legacy Long Training Field, legacy long training field), an L-SIG (Legacy Short Training Field, legacy short training field), an RL-SIG (Repeat Legacy Short Training Field, repeat legacy short training field), an HE-SIG-A (High Efficiency Signal Field, high efficiency signal field A), or an HE-SIG-B (High Efficiency Signal Field, high efficiency signal field B)) is used for a receive end to detect a packet start event, synchronization, or channel estimation, and indicate a packet format. If the packet format is a high efficiency (English: High Efficient, HE for short) packet format, a quantity of symbols of the high efficiency long training field HE-LTF is further indicated. The station sends an HE-STF signal and an HE-LTF signal on a sub-channel to provide a channel estimation reference. Optionally, the station may send a load signal after the HE-LTF signal.

The receive end receives and parses the HE-STF front signal, the HE-STF front signal indicates the quantity of symbols of the HE-LTF and a packet length, and time of data load or a quantity of symbols of the data load may be obtained according to the packet length. The receive end receives the HE-STF signal so that the receive end adjusts and synchronizes automatic gain control (Automatic Gain Control, AGC). Then the receive end receives the HE-LTF signal, and the receive end may perform channel estimation based on the HE-LTF signal. If packet length information indicates that there is data load, the receive end continues to receive the data load. The HE-LTF signal may be a row or a column in a P-matrix or a row or a column in another orthogonal matrix, and may be selected from a set including a low correlation sequence.

Based on the received HE-LTF signal, the receive end may determine whether an HE-LTF sequence on a sub-channel is used and/or determine corresponding received signal strength. Specifically, the receive end performs channel estimation based on the received HE-LTF signal to obtain a channel coefficient h, and the channel coefficient may be a plural (for example, when there is a single receive antenna) or may be a vector (for example, when there are multiple receive antennas). A received signal power value may be obtained by performing modulo operation on h and calculating a square value or performing another mathematical operation. The received signal power value depends on a channel gain and a transmit signal power of a sender. It may be determined, according to the received signal power value, whether the HE-LTF sequence on the sub-channel is used. When the power value is higher than a specified threshold, the receive end may determine that the HE-LTF sequence on the sub-channel is used. A physical layer of the receive end may add a receive vector (rxvector) message in a receive start indication (RXstart indication), so as to report a receiving result of the HE-LTF to a MAC layer. Specifically, the receiving result may include a detection result on a subcarrier/sub-channel/spatial flow/LTF sequence. Optionally, the detection result may be whether the HE-LTF sequence is used or the corresponding received signal strength.

Further, the receive end may set a threshold based on noise power strength or noise plus interference strength existing before an uplink packet is received. Alternatively, some sub-channels and/or HE-LTF sequences may be reserved when sub-channels and HE-LTF sequences are allocated. The receive end may set the threshold by measuring noise power strength or noise plus interference strength on these reserved resources. A success rate, a false detection rate, or an omission rate of determining whether an HE-LTF sequence is used may be controlled by adjusting the threshold.

Embodiment 2

This embodiment provides an access method, including:
sending, to an AP, a first frame that carries uplink transmission requirement information; and
if a second frame that carries uplink transmission indication information is received from the AP within an agreed time period, and the uplink transmission indication information includes a resource indication and a transmission manner indication, sending uplink multi-user transmission data to the AP, where multiple uplink users transmit, according to a transmission manner (including a modulation and coding scheme or transmission duration) indicated by the transmission manner indication, to-be-transmitted data on an uplink transmission resource indicated by the resource indication; or if the second frame is not received within an agreed time period, accessing, by a station, a channel in a CSMA/CA-based contention access manner.

The first frame may be sent in the CSMA/CA-based contention access manner or by using an OFDMA access method. The uplink transmission requirement information includes a packet arrival interval, packet size information, or traffic rate information. In addition, the uplink transmission requirement information may further include a flow rate, bandwidth requirement information, or a BSR. After receiving an acknowledgement frame or a response frame of the AP corresponding to the first frame, the station may suppress an access manner of CSMA contention access, including increasing a contention window parameter of the CSMA contention access, or stopping backoff number updating of the CSMA contention access, or forbidding the CSMA contention access. This implementation may decrease a probability of a contention transmission attempt of the station, thereby increasing a probability that the access point succeeds in transmission contention. The access point may instruct multiple users to perform concurrent transmission after the contention is successful, thereby improving channel access efficiency.

The AP provides an uplink transmission resource to the station by using the second frame. Specifically, the second frame may be a trigger frame. In addition, the agreed time period may be a duration having a specific time length. The agreed time period may be counted. The AP may add target sending time and/or a timeout duration indication of the second frame to the acknowledgement frame or the response frame to the first frame or in a beacon frame. The station obtains the agreed time period according to the target sending time and timeout duration. The agreed time period=the target sending time+the timeout duration. The timeout duration may further be agreed in a protocol. The station may further use time at which the acknowledgement frame or the response frame of the AP to the first frame is received plus the timeout duration as the agreed time period.

Embodiment 3

The access method provided in Embodiment 2 may use multiple different scenarios. Accordingly, this embodiment provides, corresponding to the different scenarios (or different data transmission types or different service transmission types), a process of implementing access by means of interaction between an AP and a STA. Details are as follows:

Scenario 1: Periodic and Constant-Rate Data Transmission

For example, the scenario is applicable to a voice service with mute suppression disabled. A voice service packet periodically arrives, and a coding rate of the voice service determines a packet size.

Figure 3A:
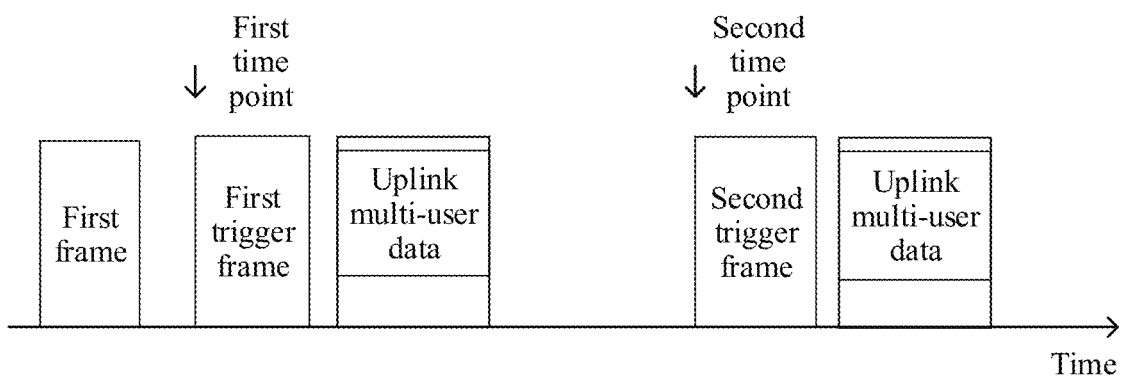
FIG. 3A is a schematic flowchart of a frame exchange in a scenario 1 according to an embodiment of the present invention.

As shown in FIG. 3A, after receiving a first frame that is sent by the STA and that carries uplink transmission requirement information, the AP sends, to the STA at a preset first time point, a first trigger frame that carries information about an uplink transmission resource, and the STA performs uplink multi-user data transmission according to an indication of the first trigger frame. The AP sends, to the STA at a preset second time point, a second trigger frame that carries the information about the uplink transmission resource, and the STA performs uplink multi-user data transmission according to an indication of the second trigger frame. The first trigger frame and the second trigger frame are equivalent to the second frame in Embodiment 2, and there may be multiple second frames.

A period in the scenario may be an absolute agreed time period or may be a non-absolute agreed time period. When this embodiment of the present invention is applied to a system in which carrier sense needs to be performed, if the AP detects that a channel is busy, the AP delays sending, and directly performs sending after the channel is idle or performs sending after backoff is completed. Therefore, sending time of the trigger frame may be later than the agreed time period, and the agreed time period is called the non-absolute agreed time period, and is called the absolute agreed time period in another case.

The STA may start a periodic and constant-rate data transmission timer in the agreed time period (for example, the first time point and the second time point in FIG. 3A) of the trigger frame to handle with timeout. If the STA receives the trigger frame in a preset condition (including before the periodic and constant-rate data transmission timer times out), the STA may cancel the timer. If the trigger frame is not received in the preset condition, the STA may access a channel by using another method.

For example, the scenario 1 is further applicable to a voice service with a variable rate. A voice service packet periodically arrives, and the voice service uses variable rate coding, leading to a variable packet size. After transmission of the first packet is completed, if there is subsequent data to be transmitted, the STA may request the AP to allocate more resources.

Figure 3B:
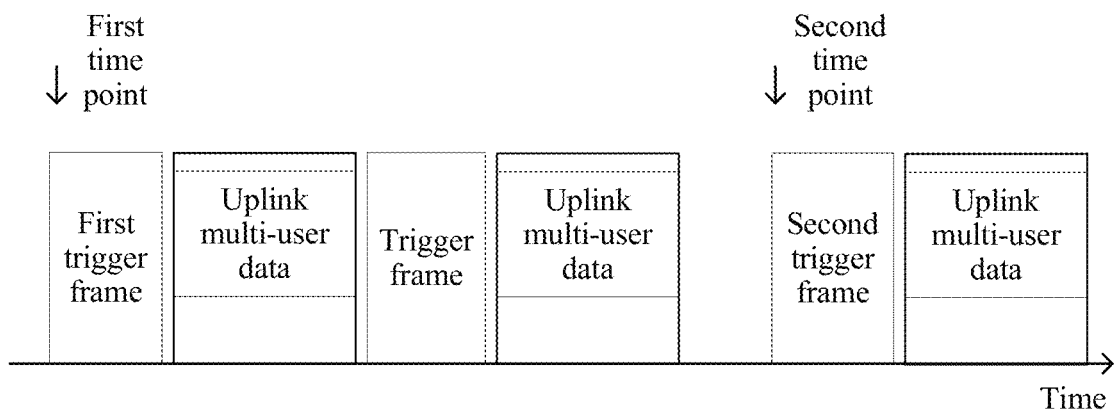
FIG. 3B is a schematic flowchart of another frame exchange in a scenario 1 according to an embodiment of the present invention.

Specifically, after receiving the first trigger frame, the STA performs uplink multi-user data transmission according to the indication in the first trigger frame (it should be noted that in this embodiment of the present invention, there may be one or more STAs that perform uplink multi-user data transmission), and the first trigger frame indicates a parameter such as a frequency band or transmission time of uplink multi-user data transmission of the STA. If a quantity of resources allocated by the AP is less than that required by the STA, the STA may add a bandwidth indication (or a remaining buffer size non-zero indication, that is, a buffer has data to be transmitted) in uplink multi-user data transmission. If the bandwidth indication bit is 1, it represents that the STA needs more uplink resources, and the AP may provide, in a subsequent trigger frame, an uplink multi-user data transmission resource indication to the STA. As shown in FIG. 3B, after the first trigger frame is sent and before the second trigger frame is sent, the AP may continue to send a trigger frame to the STA, and the trigger frame indicates a resource for further uplink multi-user data transmission. In this way, if the quantity of resources previously allocated by the AP is less than that required by the STA, the STA may continue to perform uplink multi-user data transmission on the uplink multi-user data transmission resource indicated by the trigger frame.

Scenario 2: Aperiodic and Equal-Size Data Transmission

After receiving a first frame that is sent by the STA and that carries uplink transmission requirement information, the AP sends a null data trigger frame to the STA, and the null data trigger frame includes an agreed time period. The agreed time period may be a time relative to a beacon frame of the AP, or a periodic time, or a combination of both. The AP receives a reply of the STA to a null data trigger frame 1. According to the reply, the AP sends a trigger frame to provide an uplink multi-user data transmission resource to the STA.

Figure 3C:
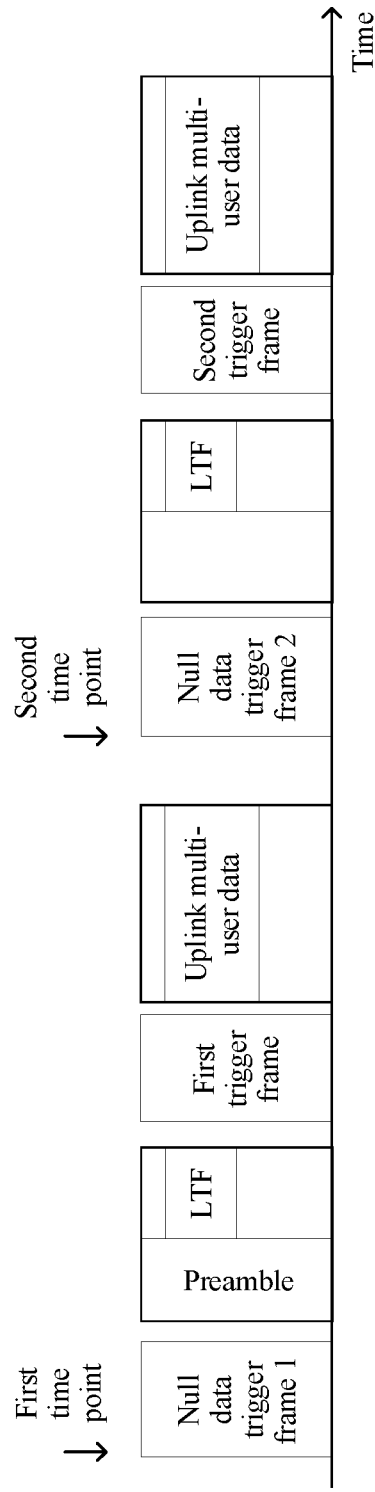
FIG. 3C is a schematic flowchart of a frame exchange in a scenario 2 according to an embodiment of the present invention.

As shown in FIG. 3C, the AP sends the null data trigger frame 1. After receiving the null data trigger frame 1, the STA performs uplink transmission and may include an agreed sequence (for example, an LTF sequence or an LTF sequence on a specific sub-channel) in an uplink transmission frame. The sequence may be included in the null data trigger frame 1 and specified by the AP, or may be specified by the AP when the STA and the AP are associated.

The AP receives the sequence on a specific sub-channel. If the sequence is a sequence agreed with a STA, the AP sends the first trigger frame to the STA, and the first trigger frame carries information about an uplink multi-user data transmission resource that is allocated by the AP to the STA according to packet size information or traffic rate information. After receiving the first trigger frame, the STA performs uplink multi-user data transmission according to the uplink multi-user data transmission resource indicated by the first trigger frame.

When the beacon frame indicates the agreed time period of the null data trigger frame, or the AP and the STA negotiate the agreed time period of the null data trigger frame, the STA may start a null data trigger frame timer in the agreed time period (for example, a first time point in FIG. 3C) of the null data trigger frame. If receiving the null data trigger frame in a preset condition (including before the periodic and constant-rate data transmission timer times out), the STA may cancel the timer.

The station may start an uplink data scheduling transmission timer. If the first trigger frame (or a second frame that carries information about an uplink transmission resource) is received in the preset condition (including before the uplink data scheduling transmission timer times out), and uplink data transmission resource allocation information of the STA is included, the STA may cancel the timer. If the trigger frame is not received in the preset condition, the STA may access a channel by using another method.

Scenario 3: Periodic and Variable-Rate Data Transmission

Figure 3D:
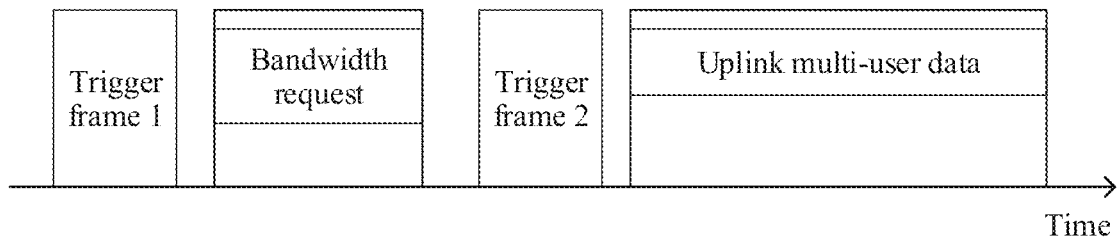
FIG. 3D is a schematic flowchart of a frame exchange in a scenario 3 according to an embodiment of the present invention.

As shown in FIG. 3D, after receiving a first frame that is sent by the STA and that carries uplink transmission requirement information, the AP may contend for a channel and send a trigger frame 1 after contention backoff is completed. After receiving the trigger frame 1, the STA may include buffer status report information or bandwidth request information in uplink multi-user data transmission. After the AP receives a request of the STA, the AP sends a trigger frame 2, and the trigger frame 2 indicates an uplink multi-user data transmission resource that is allocated by the AP to the station according to the user request. After receiving the trigger frame 2, the STA performs uplink multi-user data transmission according to the uplink multi-user data transmission resource indicated by the trigger frame.

Scenario 4: Aperiodic and Variable-Size Data Transmission

Figure 3E:
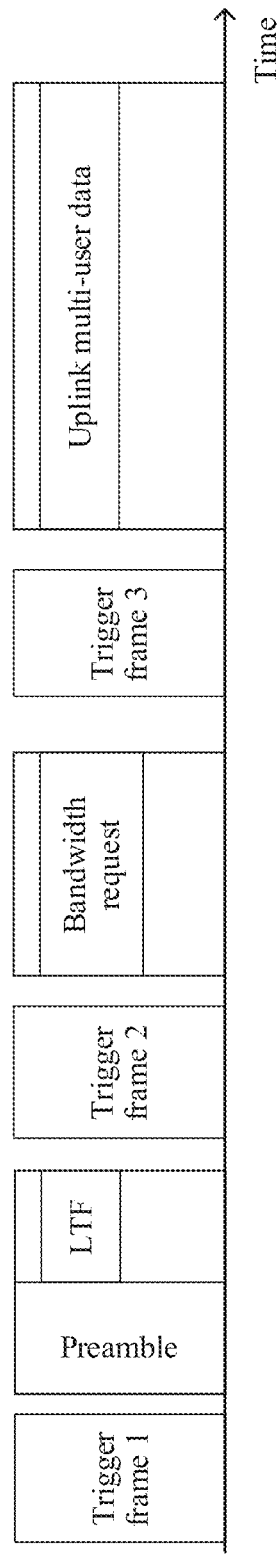
FIG. 3E is a schematic flowchart of a frame exchange in a scenario 4 according to an embodiment of the present invention.

As shown in FIG. 3E, after receiving a first frame that is sent by the STA and that carries uplink transmission requirement information, the AP may contend for a channel and send a trigger frame 1 after contention backoff is completed, and the trigger frame 1 indicates a quantity of spatial flows or a quantity of LTF symbols or a sequence length for uplink transmission. After receiving the trigger frame 1, the STA may include an agreed sequence (for example, an LTF sequence or an LTF sequence on a specific sub-channel) in an uplink transmission frame 1.

The AP receives the sequence on a sub-channel, and if the sequence is a sequence agreed with a STA, the AP sends a trigger frame 2. The trigger frame 2 may include a received sequence number or a sub-channel number, or a number jointly determined by the sequence number and the sub-channel number, and the AP instructs a STA corresponding to the number to send buffer status report information or bandwidth request information. Alternatively, the trigger frame 2 carries a station identifier, and the AP instructs a STA having the station identifier to send buffer status report information or bandwidth request information.

After receiving the trigger frame 2, the STA sends, according to an indication of the trigger frame 2, an uplink transmission frame 2 that carries a bandwidth request, and the uplink transmission frame 2 includes buffer status report information or bandwidth request information. After receiving the uplink transmission frame 2, the AP sends a trigger frame 3 according to the uplink transmission frame 2 to allocate an uplink resource to the STA. After receiving the trigger frame 3, the STA performs uplink multi-user data transmission according to the uplink multi-user data transmission resource indicated by the trigger frame 3.

Scenario 5: Aperiodic and Low-Delay Data Transmission

Figure 3F:
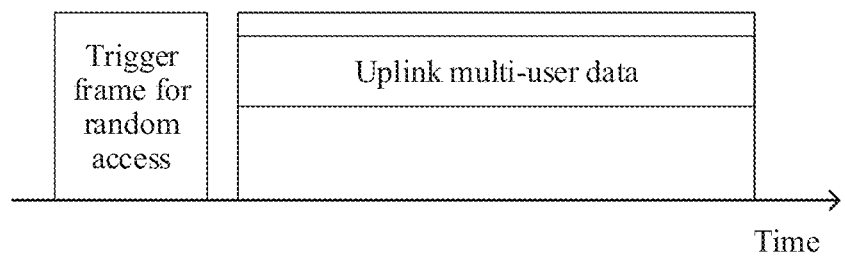
FIG. 3F is a schematic flowchart of a frame exchange in a scenario 5 according to an embodiment of the present invention.

As shown in FIG. 3F, the STA may report existence of aperiodic and low-delay data transmission to the AP. The AP sends a trigger frame for random access, and the trigger frame indicates uplink multi-user data transmission resource allocation. At least one uplink resource (for example, an OFDMA sub-channel) is used for random access. After receiving the trigger frame, the station selects an uplink resource to perform uplink random access, or chooses to not perform uplink random access.

Figures 1, 3G:
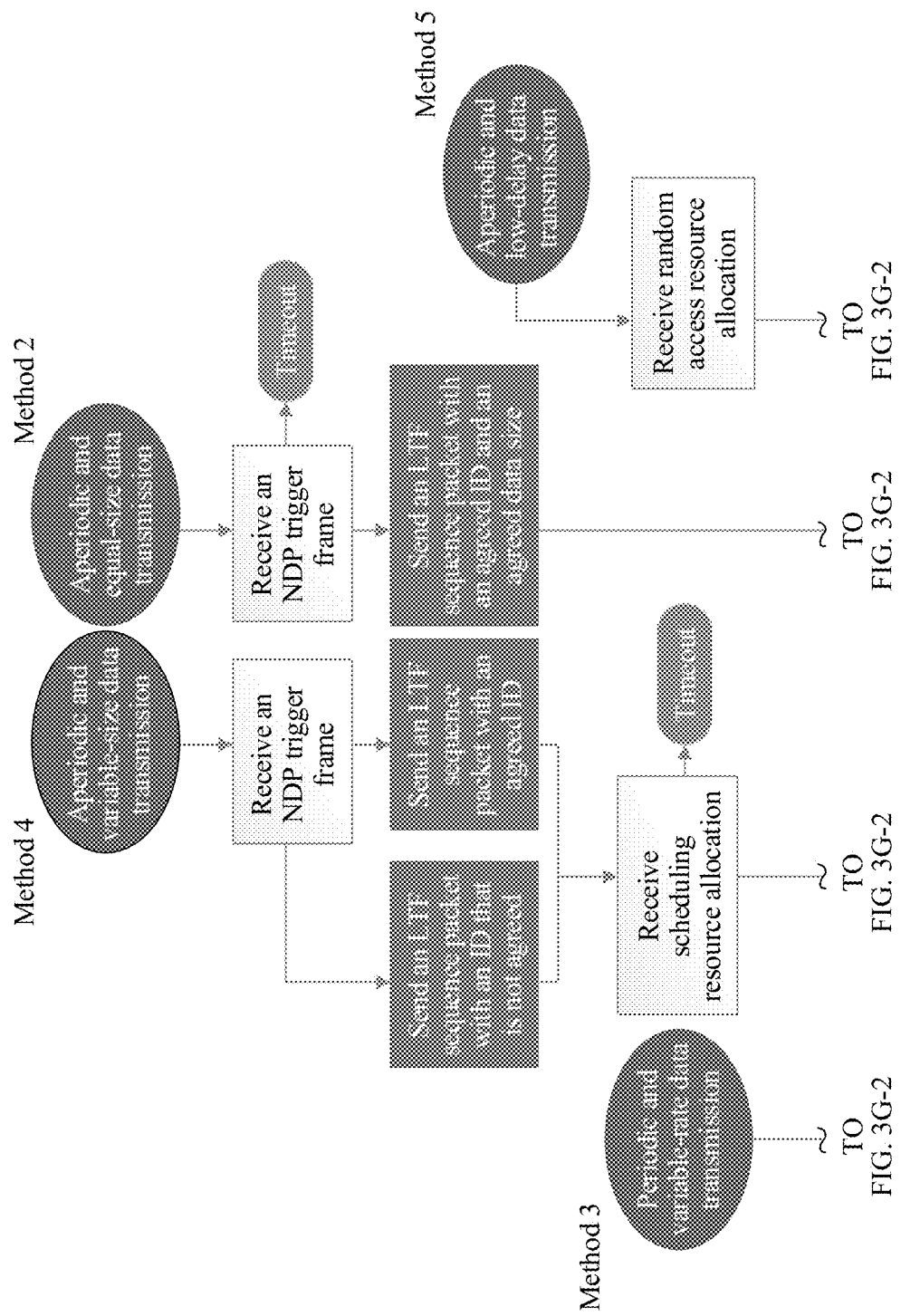
Figures 2, 3G:
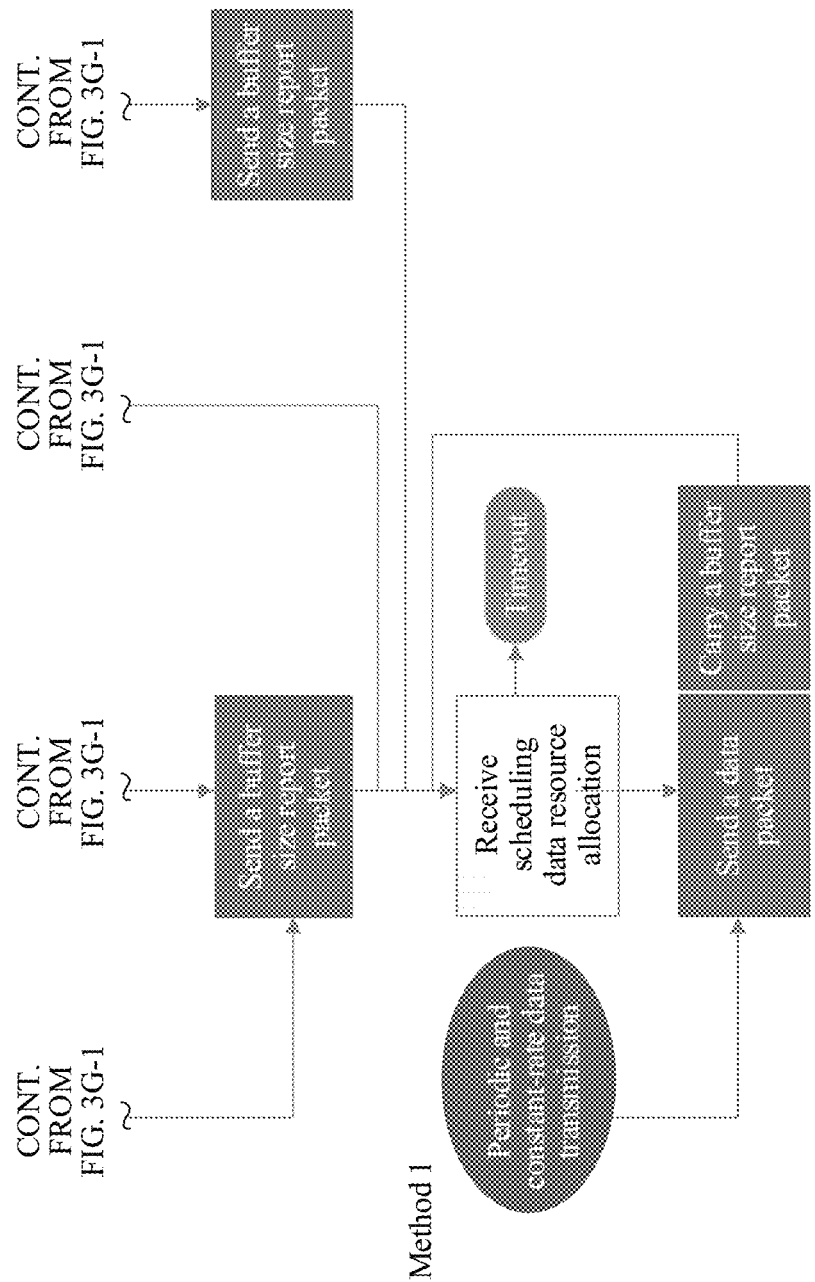

FIG. 3G-1 and FIG. 3G-2 are schematic diagrams in which multiple transmission manners jointly work. As shown in FIG. 3G-1 and FIG. 3G-2, multiple transmission manners that are applicable to different scenarios may jointly work. When data of different types needs to be transmitted, according to a scenario to which the data is applicable, a corresponding transmission manner may be selected or multiple transmission manners may be selected at the same time to perform transmission.

Embodiment 4

This embodiment provides an access method, including:

receiving, from an AP, a first frame that carries information about an uplink transmission resource;

sending, to the AP, a second frame that carries uplink transmission requirement information, and disabling a CSMA/CA-based contention access manner or suspending a CSMA/CA contention access backoff timer corresponding to an uplink transmission requirement information queue; and if a third frame that carries information about an uplink transmission resource is received from the AP within an agreed time period, sending uplink multi-user transmission data to the AP, where the uplink multi-user transmission data is transmitted on the uplink transmission resource; or if the third frame is not received within an agreed time period, enabling, by a station, the CSMA/CA-based contention access manner to access a channel or resuming the CSMA/CA contention access backoff timer corresponding to the uplink transmission requirement information queue.

The information about the uplink transmission resource in the third frame may further include an identifier of one or more stations that use the uplink transmission resource. The backoff timer may further be a backoff counter.

The uplink transmission requirement information includes whether the STA has data to be sent, and this may be indicated by using one bit. Multiple STAs may simultaneously send the second frame that carries the uplink transmission requirement information (training parts of the second frames may be the same or overlap, and load parts of the second frames may not overlap). In addition, disabling or enabling the CSMA/CA-based contention access manner may be disabling or enabling a CSMA/CA-based contention access function by the STA. The third frame may be a trigger frame.

Figure 4:
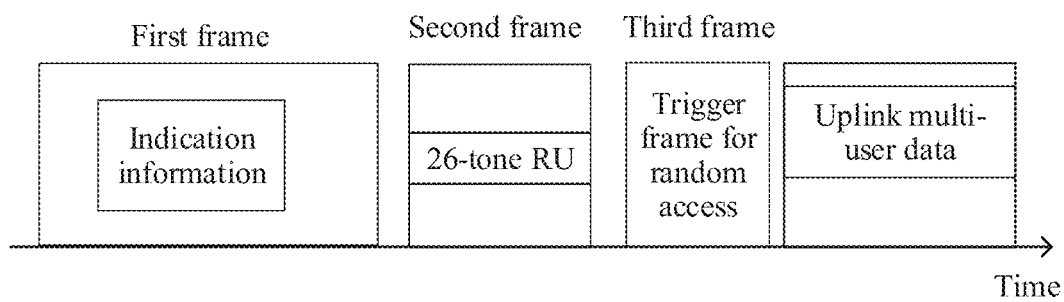
FIG. 4 is a schematic flowchart of a frame exchange of an access method according to Embodiment 4 of the present invention.

FIG. 4 is a schematic flowchart of a frame exchange of the access method according to Embodiment 4 of the present invention. As shown in FIG. 4, the AP sends, to the STA, the first frame (for example, a data frame or a trigger frame is used to carry indication information) that carries the information (which may be considered as the indication information, such as indication information in FIG. 4) about the uplink transmission resource. The indication information indicates the uplink transmission resource that can be allocated to the STA to perform uplink multi-user transmission (that is, the access point notifies, by using the first frame, the station that there is an available uplink transmission resource, and the access point instructs, by using the first frame, any user to respond to the first frame without requiring backoff). The STA that needs to perform uplink multi-user data transmission may send the uplink transmission requirement information according to the indication information. The AP may further indicate, according to the indication information, a parameter for the STA to perform uplink multi-user data transmission (for example, indicate an uplink transmission resource, a use manner, or a sub-channel that is used by the STA, allocation of a spatial flow, or a modulation and coding scheme). The STA generates, according to the parameter, the second frame (for example, a frame that carries 26-tone RU information) that carries the uplink transmission requirement information. Because all STAs use a same parameter, generated second frames are the same. Therefore, although multiple users use a same resource to transmit the frame, the signals of the multiple users do not interfere with each other, and the AP may receive one or more second frames (which may be multiple overlapped second frames). After receiving the second frame, the AP may send the third frame (for example, the trigger frame for random access). If the AP does not occupy a TXOP or a third frame exchange cannot be completed in a remaining TXOP time, the AP may contend for a channel and send the third frame after contention backoff is completed. If the AP occupies a TXOP, the AP may send the trigger frame. After receiving the trigger frame, the STA performs uplink multi-user data transmission according to the trigger frame.

Table 1 lists three technical solutions for triggering data transmission. In a technical solution 1, a specific user is specified to perform sending on a specific resource (the station does not need to perform contention backoff). In a technical solution 2, any user is specified to perform random sending within a specific resource range. In the technical solution provided in this embodiment, any user is specified to perform sending on a specific resource. It should be noted that after receiving the second frame, the AP is allowed to trigger multi-user data transmission. For example, the AP may trigger multi-user data transmission by using the technical solution 1 or 2 in table 1.

TABLE 1

Comparison between the solution provided in this embodiment and another solution

| | | |
|---|---|---|
| Technical solution 1: OFDMA scheduling manner | Specific user | Specific resource |
| Technical solution 2: OFDMA contention manner | Any user | One or more resources (the station needs to perform contention backoff) |
| Technical solution in this embodiment | Any user | Specific resource (the station does not need to perform contention backoff) |

Embodiment 5

When initially accessing an AP, a STA may determine a channel access manner according to an instruction of the AP, or may negotiate the channel access manner with the AP, or the channel access manner may be predetermined in a protocol.

Specifically, when initially accessing a channel, the STA learns, by receiving a beacon frame, the channel access manner for accessing the AP. If the AP provides no indication, a default channel access manner (for example, the default access manner is a CSMA/CA-based contention access manner) is used. The STA sends an association request frame to the AP. The association request frame carries information about a channel access manner supporting capability/policy of the STA or about a version of the station, and the information represents a default supporting capability of the STA. Alternatively, the AP obtains the default supporting capability of the STA according to a format (for example, a frame version/modulation and coding scheme) of the association request frame. After receiving the association request frame, the AP sends an association response frame to the STA. The association response frame carries a channel access policy (for example, carries information that indicates a channel access manner used by the STA to access a channel). The STA accesses the channel according to the channel access policy.

For example, when a STA performs initial access, the AP may specify an access manner for the STA according to information (for example, an access manner or a quantity of connected STAs) about a currently connected STA. When there are many connected STAs, an OFDMA-based scheduling access manner may be used.

Embodiment 6

Figure 5:
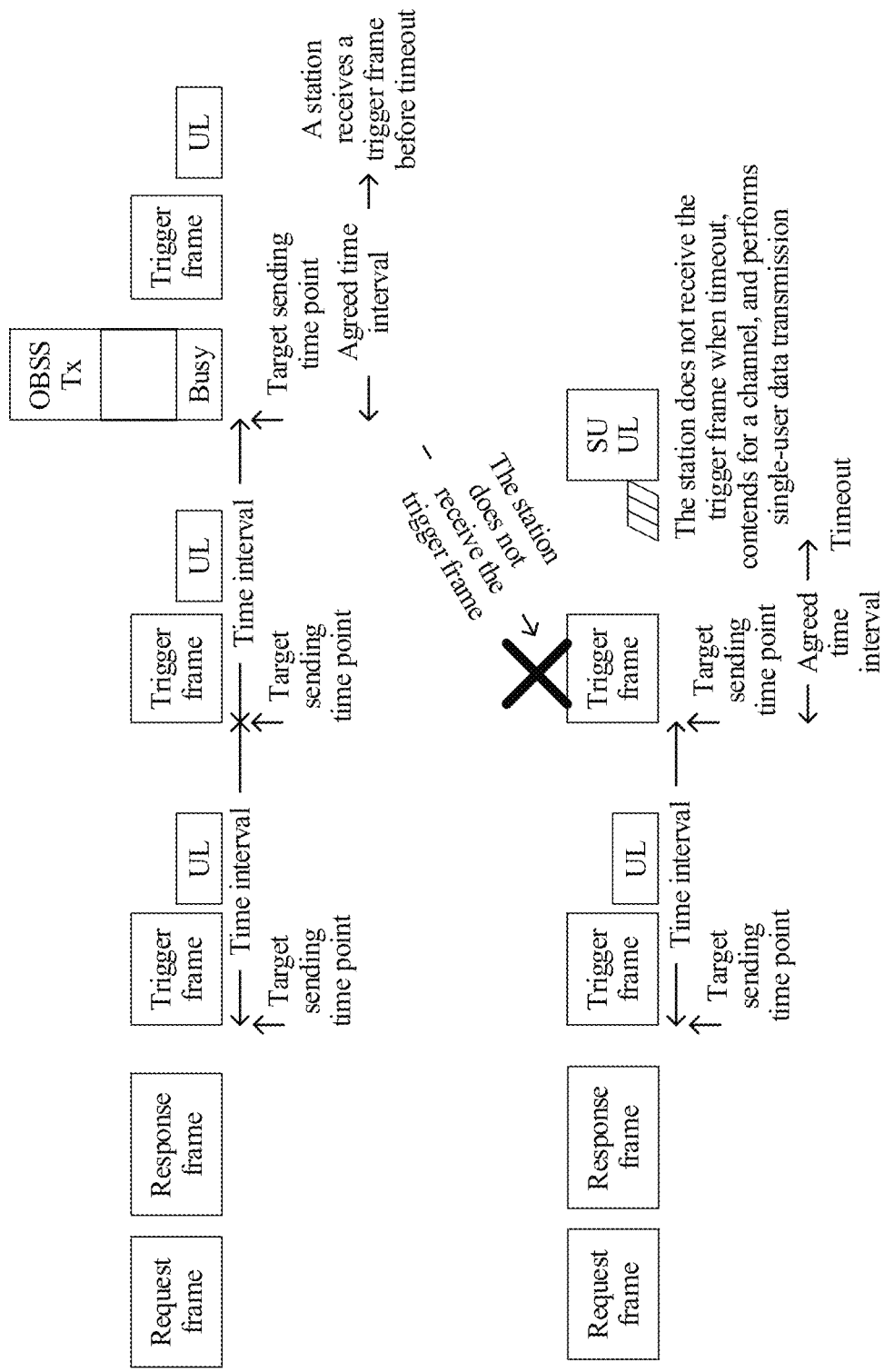
FIG. 5 is a schematic diagram of several situations in which a timer needs to be used.

This embodiment provides a timer design and timeout processing in an access process, for example, timing processing about an agreed time period in each embodiment of the present invention. Details are as follows:

FIG. 5 is a schematic diagram of several situations in which a timer needs to be used. As shown in FIG. 5, in a case with an overlapping basic service set (English: Overlapping Basic Service Set, OBSS for short), if an AP is within a coverage area of the OBSS, the AP backs off when detecting that a channel is busy, and trigger frame sending in the agreed time period is delayed. After the channel is idle, the AP contends for the channel and sends a trigger frame after obtaining the channel by means of contention.

If a STA is within the coverage area of the OBSS, the AP completes backoff if not detecting that the channel is busy, and the AP sends a trigger frame. Because the STA is affected by transmission interference or noise or another environment factor in the OBSS, the STA continues waiting if the STA fails to receive the trigger frame of the AP. However, because the AP has sent the trigger frame, and the STA may not receive the trigger frame of the AP, the STA needs to actively perform EDCA contention.

If both the AP and the STA are within the coverage area of the OBSS, the AP suspends counting of a backoff count if detecting that a channel is busy and does not resume the counting of the backoff count until the channel is idle. After backoff is completed, the AP sends the trigger frame. Because the STA can monitor transmission of the OBSS, the STA may infer that the AP delays the trigger frame sending because of the OBSS. The STA may wait for longer time, that is, the STA may consider, during waiting, a transmission delay caused by the ODSS.

Specifically, the STA may set a timer (or a backoff counter) at agreed trigger frame arrival time, or may set a timer (or a backoff counter) after receiving an uplink packet or after a queue of the STA changes from empty to non-empty.

Figure 5A:
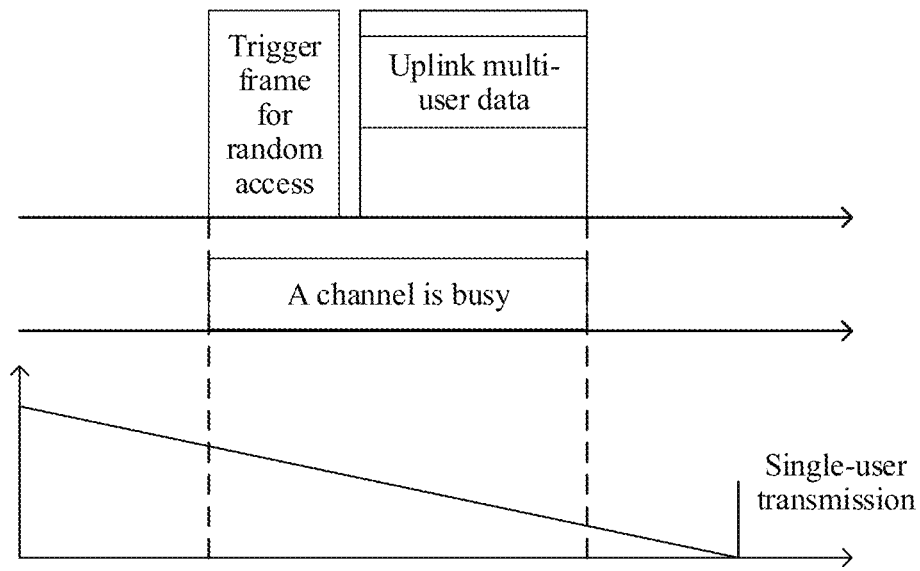
FIG. 5A is a schematic working diagram of a first timer according to an embodiment of the present invention.

FIG. 5A is a schematic working diagram of a first timer according to an embodiment of the present invention. As shown in FIG. 5A, when the STA has uplink data to be transmitted or a queue of the STA changes from empty to non-empty, the STA or the queue starts a countdown. A duration of the countdown may be specified by the AP or agreed in a protocol.

Figure 5B:
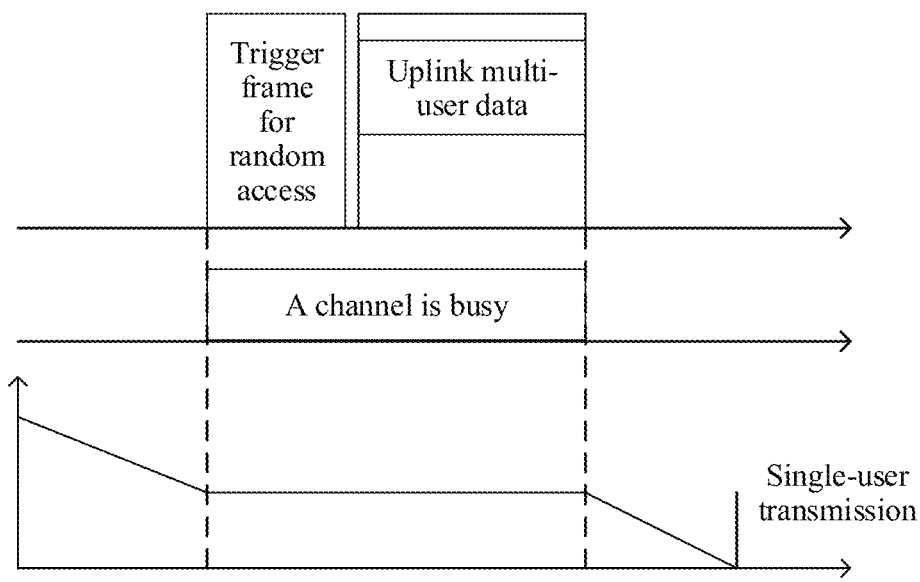
FIG. 5B is a schematic working diagram of a second timer according to an embodiment of the present invention.

FIG. 5B is a schematic working diagram of a second timer according to an embodiment of the present invention. As shown in FIG. 5B, after the STA receives an uplink packet or a queue of the STA changes from empty to non-empty, the STA or the queue sets a backoff number. The backoff number may be specified by the AP or agreed in a protocol. When the channel is idle, the backoff number progressively decreases. Specifically, the backoff number may progressively decrease by one after each unit of time passes. When the channel is busy, progressive decreasing of the backoff number is suspended.

Figure 5C:
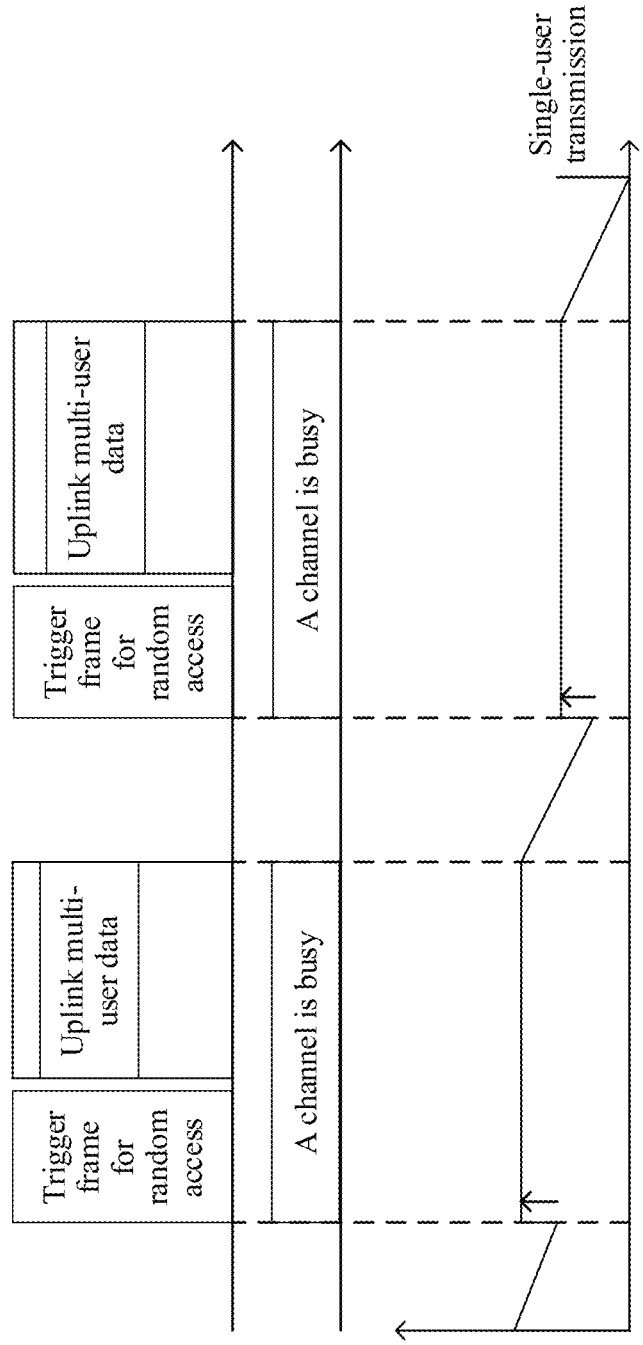
FIG. 5C is a schematic working diagram of a third timer according to an embodiment of the present invention.

FIG. 5C is a schematic working diagram of a third timer according to an embodiment of the present invention. As shown in FIG. 5C, after the STA receives an uplink packet or a queue of the STA changes from empty to non-empty, the STA or the queue sets a backoff number. The backoff number may be specified by the AP or agreed in a protocol. When the channel is idle, the backoff number progressively decreases. Specifically, the backoff number may progressively decrease by one after each unit of time passes. When the channel is busy, progressive decreasing of the backoff number is suspended. Further, when receiving a trigger frame for uplink random access sent by the AP, the STA updates the backoff number, for example, increases the backoff number. Receiving the trigger frame represents that the AP has an intention to trigger multiple users to perform uplink transmission. The AP obtains a channel by means of contention to send the trigger frame for uplink random access. To improve a probability that the AP obtains a channel by means of contention, the STA actively decreases intensity of contending for a channel by the STA. Specifically, the STA may add a constant on the basis of a current backoff number, and the constant is preset in a protocol or is specified by the AP in a message frame (for example, an association response frame or a beacon frame). Alternatively, a current backoff number may be multiplied by a constant. The constant is preset in a protocol or is specified by the AP in a message frame.

Figure 5D:
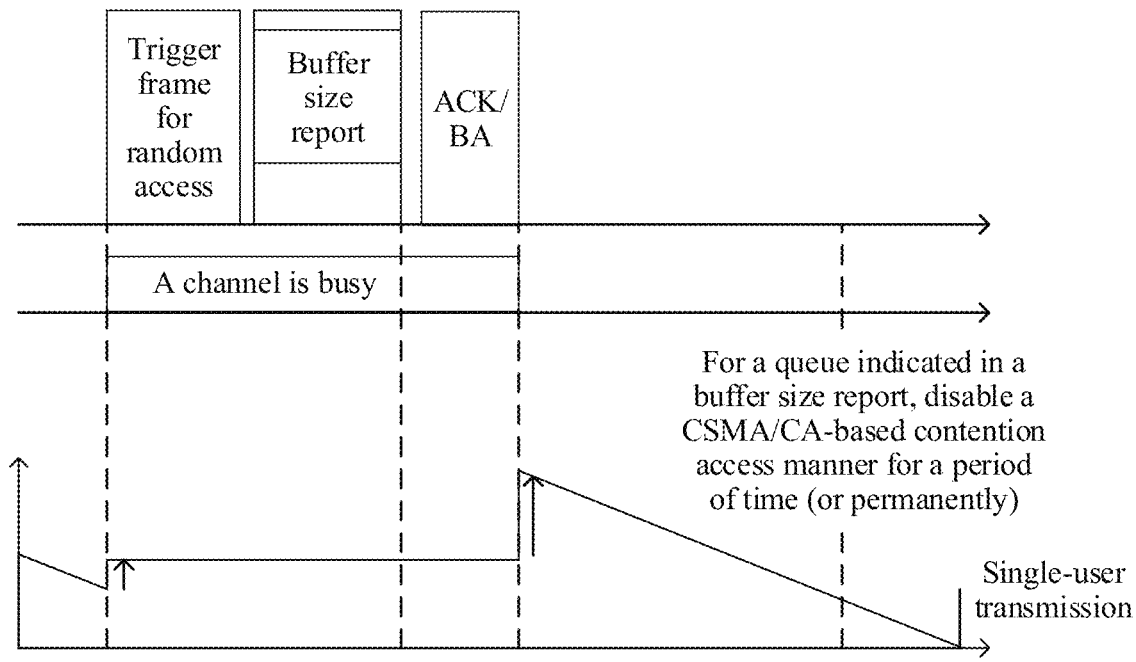
FIG. 5D is a schematic working diagram of a fourth timer according to an embodiment of the present invention.

FIG. 5D is a schematic working diagram of a fourth timer according to an embodiment of the present invention. As shown in FIG. 5D, when the STA performs uplink transmission, for example, sends a buffer size report or a bandwidth request, and receives an acknowledgement frame of the AP for successful transmission, the STA may update a backoff number. Because the STA has sent, to the AP, an amount of data that needs to be transmitted or required bandwidth information, the AP allocates a resource to the STA. Therefore, the STA may decrease, by updating the backoff number, intensity of contending for a channel by the STA, so as to increase an AP scheduling opportunity.

Embodiment 7

After a STA obtains a channel, the STA may hand over a control right to an AP, and the AP instructs one or more STAs to perform uplink multi-user data transmission.

Figure 6A:
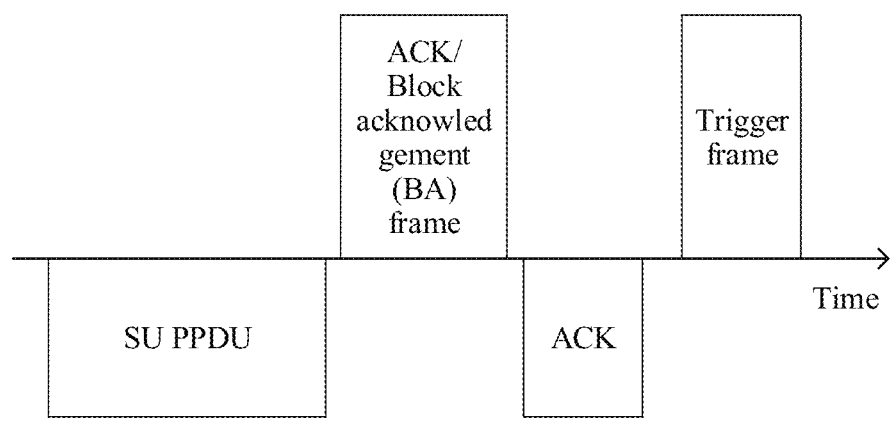
FIG. 6A is a first schematic diagram of sending a multi-user transmission trigger frame according to an embodiment of the present invention.

FIG. 6A is a first schematic diagram of sending a multi-user transmission trigger frame according to an embodiment of the present invention. As shown in FIG. 6A, the STA accesses the channel in an EDCA manner and sends a single-user physical layer protocol data unit (English: Physical layer Protocol Data Unit, SU-PPDU for short). After the AP receives the uplink SU-PPDU sent by the STA, the AP replies with an acknowledgement frame or a block acknowledgement frame. The AP may indicate, in the frame, that the AP is to send a multi-user transmission trigger frame by using a control channel. For example, the AP may indicate, in the frame by using 1 bit, that the AP is to send a multi-user transmission trigger frame by using a control channel. After the STA receives the frame, if it is indicated in the frame that the AP is to send a multi-user transmission trigger frame by using a control channel, the STA may send an acknowledgement frame (the acknowledgement frame is used to confirm that the AP can send, by using a control channel, a frame for triggering uplink multi-user data transmission). Otherwise, the STA continues to send the uplink SU-PPDU.

The AP sends a multi-user transmission trigger frame after receiving the acknowledgement frame of the STA. The AP may include, in the trigger frame, information about an uplink transmission resource of the STA or of the STA and another STA. After the acknowledgement frame of the STA is received, the trigger frame may be sent after a SIFS time.

Optionally, after receiving the acknowledgement frame of the STA, the AP may send the multi-user transmission trigger frame after an interval of duration 1 (an agreed time period longer than a SIFS). During the time, the AP detects a busy or idle state of the channel. If the channel is idle, the AP sends the multi-user transmission trigger frame. If the channel is busy, the AP sends a short packet whose transmission time is shorter than a threshold, the short packet may be an acknowledgement frame or another short frame, and the STA may continue to use the channel after receiving the short packet. Alternatively, if the channel is busy, the AP may not send a data packet. When the STA does not detect, during duration 2 (for example, a time longer than the duration 1), that the channel is busy or there is a packet to be sent, the STA may continue to send a data packet.

Figure 6B:
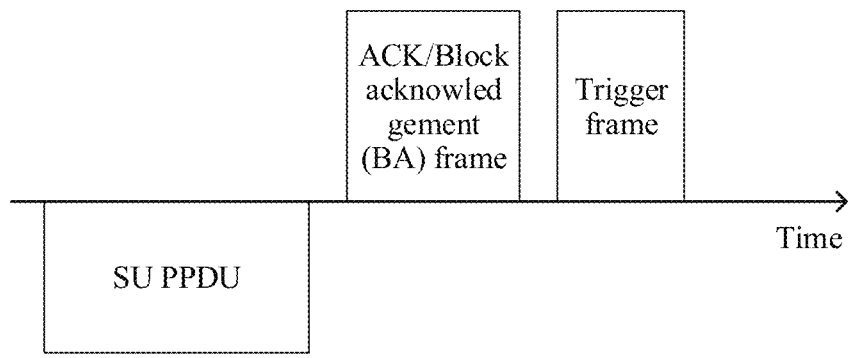
FIG. 6B is a second schematic diagram of sending a multi-user transmission trigger frame according to an embodiment of the present invention.

FIG. 6B is a second schematic diagram of sending a multi-user transmission trigger frame according to an embodiment of the present invention. As shown in FIG. 6B, the AP sends an acknowledgement frame or a block acknowledgement frame after receiving an uplink SU PPDU, and sends a multi-user transmission trigger frame after a SIFS time. Compared with the method shown in FIG. 6A, the AP may directly trigger, after sending the acknowledgement frame or the block acknowledgement frame, the STA to perform uplink multi-user data transmission without a need of waiting to receive an acknowledgement frame replied by the STA.

Figure 6C:
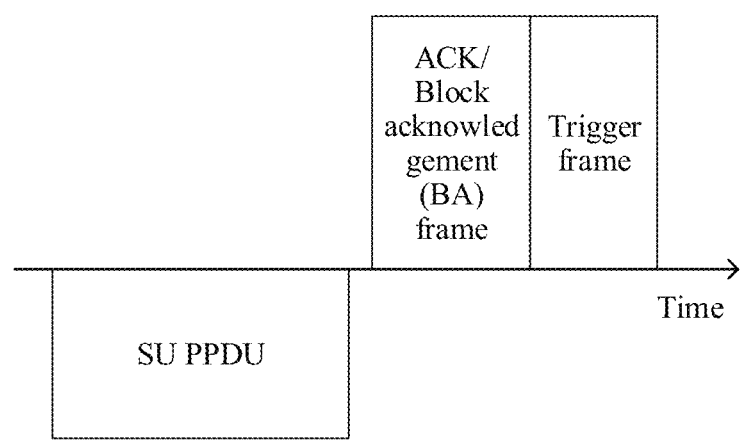
FIG. 6C is a third schematic diagram of sending a multi-user transmission trigger frame according to an embodiment of the present invention.

Optionally, FIG. 6C is a third schematic diagram of sending a multi-user transmission trigger frame according to an embodiment of the present invention. As shown in FIG. 6C, the AP sends an acknowledgement frame or a block acknowledgement frame after receiving an uplink SU-PPDU, and the acknowledgement frame carries uplink transmission trigger information. In this case, the AP does not need to indicate, in the frame by using 1 bit, that the AP is to send a multi-user transmission trigger frame by using a control channel. After one or more STAs receive the information, the STA sends uplink multi-user transmission data according to the uplink transmission trigger information.

Figure 6D:
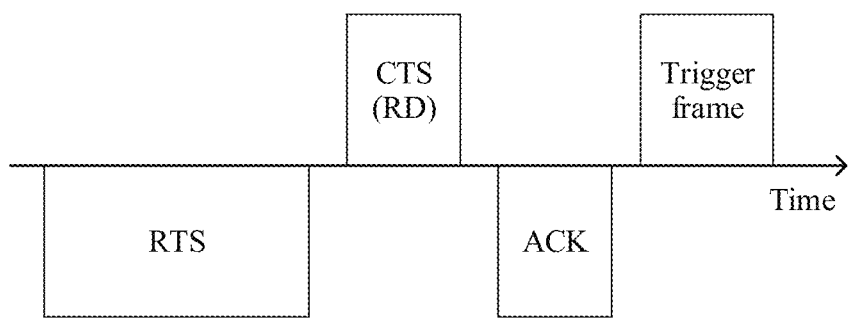
FIG. 6D is a fourth schematic diagram of sending a multi-user transmission trigger frame according to an embodiment of the present invention.

FIG. 6D is a fourth schematic diagram of sending a multi-user transmission trigger frame according to an embodiment of the present invention. As shown in FIG. 6D, the STA sends an RTS packet and the AP replies with a CTS packet. The AP may indicate, by using the CTS packet, whether a multi-user transmission trigger frame needs to be sent by using a control channel.

If the AP needs to send a multi-user transmission trigger frame by using a control channel, for a STA that supports this interaction process (for example, a STA that supports a protocol version, or a STA that notifies the AP that the STA supports this interaction process, or a STA that supports handing over a channel control right), the AP may fill a MAC address of the AP in a receive address (RA) field of the CTS. Otherwise, the AP may fill a MAC address of an RTS sender in the RA of the CTS. After the STA receives the CTS, if an RA address carried in the CTS is an address of the AP, the STA sends a short packet (for example, an acknowledgement frame), and the AP sends a multi-user transmission trigger frame after receiving the short packet. The AP may include, in the multi-user transmission trigger frame, uplink transmission resource indication information of the STA or of the STA and another STA. The STA performs data transmission according to the uplink transmission resource indication information after receiving the multi-user transmission trigger frame.

Embodiment 8

This embodiment of the present invention proposes an access manner (for example, the foregoing three uplink access manners) of a STA, and the access manner may be specified by an AP. After the AP specifies an access manner to the STA, the STA can perform access and data transmission in only the access manner specified by the AP. The AP may specify an access manner by sending a radio frame to the STA. The radio frame may carry indication information that is used to indicate the access manner of the STA. The radio frame may be a beacon frame or an association response frame.

Specifically, this embodiment proposes an access method, including:

receiving a radio frame sent by an AP, wherein the radio frame indicates an access manner for performing channel access, and the radio frame is an association response frame, a beacon frame, or a response frame of the AP to a received data frame; and if a second frame (for example, a trigger frame) that carries information about an uplink transmission resource is received from the AP within an agreed time period, sending uplink multi-user transmission data to the AP, where the uplink multi-user transmission data is transmitted on the uplink transmission resource; or if the second frame is not received within an agreed time period, accessing, by a station, a channel in a CSMA/CA-based contention access manner.

If the radio frame is a beacon frame, a specific process of this embodiment is as follows:

Step 1: The AP generates the beacon frame, and the beacon frame carries indication information that is used to indicate an access manner of the STA.

Step 2: The AP sends the beacon frame.

The indication information in step 1 may be public information shared by all STAs, or may be private information dedicated for one or more STAs and separately indicating a transmission manner to each STA. For the latter, the beacon frame may further include an identifier (for example, an association identifier AID) of the one or more STAs.

The indication information sent to each STA may be a field. A value of the field may indicate one or more transmission manners that can be used by the STA. The indication information may further be a bitmap (bitmap). Each bit may indicate whether a transmission manner is allowed to be used.

If the radio frame is an association response frame, a specific process of this embodiment is as follows:

Step 1: The STA sends an association request frame to the AP.

Step 2: The AP sends an association response frame to the STA, and the association response frame includes indication information that is used to indicate an access manner of the STA.

In addition, the association request frame and the association response frame in step 1 and step 2 may further be a re-association request frame and a re-association response frame. Processes are the same, and details are not described herein again.

Embodiment 9

According to an access manner used by a STA, there are three data transmission states of the STA:

Contention state: The STA can perform data transmission only in a contention-based manner, for example, the manner 1 and/or the manner 2 in the foregoing three access manners.

Scheduling state: The STA can perform data transmission only in a scheduling-based manner, for example, the manner 3.

Hybrid state: The STA can perform data transmission in both a contention-based manner and a scheduling-based manner, for example, any one of the manner 1, the manner 2, or the manner 3.

The AP specifies an access manner to the STA, and this is actually allocating a data transmission state to the STA. However, the data transmission state of the STA may need to change with time. For example, when there are few STAs in a system, the hybrid state of the STA is more conducive to sending data of the STA. When there are many STAs, the contention state or the scheduling state of the STA helps improve overall system performance. Therefore, this embodiment proposes a method for switching a data transmission state of a STA.

When the STA is in a data transmission state and successfully sends a data frame to an AP, the AP sends a response frame to the STA, and the response frame carries indication information that is used to indicate a data sending manner of the STA (or enable the STA to enter a data transmission state). A specific process is as follows:

Step 1: The STA sends a radio frame to the AP. The radio frame may be a data frame.

Step 2: The AP sends a response frame to the STA, and the response frame carries indication information that is used to indicate a data sending manner of the STA.

When the STA is in the contention state and successfully sends a data frame to the AP, and the AP discovers that there are many STAs in a system at this time, because excessive contention-state STAs greatly affect the overall system performance, the AP sends, in a response frame, indication information to the STA, so that the STA enters the scheduling state, thereby decreasing a contention degree inside the system and improving overall channel resource utilization.

Alternatively, the AP may enable, by using the indication information, the STA to enter the hybrid state from the contention state. The STA should monitor a channel to receive a trigger frame, or preferably choose to send a buffer status report BSR instead of directly sending a data frame.

Similarly, the AP may further enable, by using the indication information, the STA to enter the contention state from the hybrid state. In this case, the STA can send data only in the manner 1 and/or the manner 2, and this affects contention access policy selection by the AP.

It should be noted that step 1 in the foregoing process may be omitted, that is, the AP directly sends a radio frame to the STA, and the radio frame carries indication information that is used to indicate a data sending manner of the STA.

In addition, the STA may determine a transmission mode according to a specific rule when no indication information is received. For example, the STA uses an OFDMA-based scheduling access manner by default. Optionally, if the STA uses the OFDMA-based scheduling access manner, a timer may be set. After the timer times out, the STA may use a CSMA/CA-based contention access manner or an OFDMA-based contention access manner.

Embodiment 10

The OFDMA-based contention access manner is that an AP sends a trigger frame for random access (English: Trigger Frame for Random access, TFR for short) and specifies one or more sub-channels in the TFR for random access. After receiving the TFR, when a condition is met (or when a condition for responding to the TFR is met), a STA may randomly select a sub-channel for random access to perform transmission. Because the STA randomly selects a sub-channel, a probability of a collision is relatively large. Analysis shows that highest channel utilization of this method is about 37%. When a large quantity of STAs jointly participate in contention, channel utilization may be lower. Therefore, this embodiment provides the following three data sending methods.

Method 1: After the STA receives the TFR and when the condition is met:

the STA sends an unfragmented data frame (for example, an unfragmented MAC layer protocol data unit (English: MAC layer Protocol Data Unit, MSDU for short)) within a time specified by the TFR; or if the STA sends, within a time specified by the TFR, an aggregated MPDU that includes multiple MPDUs, the multiple MPDUs include a maximum of one fragmented data frame, for example, only the last MPDU includes a fragmented data frame.

Method 2: After receiving the TFR, the STA is not allowed to send a data frame unless the data frame carries a buffer status report BSR.

Method 3: After receiving the TFR, the STA is not allowed to send a data frame.

Embodiment 11

For the OFDMA-based scheduling access manner, after receiving a trigger frame sent by an AP, a STA may perform data transmission on a corresponding channel according to an indication of the trigger frame. Before the AP sends the trigger frame to the STA, the STA needs to send a buffer status report BSR to the AP. The BSR may be sent in the CSMA/CA-based contention access manner (manner 1) or in the OFDMA-based contention access manner (manner 2). In view of a problem about whether the STA is allowed to send the BSR (or another control frame/management frame) in the two contention access manners, this embodiment proposes the following several feasible solutions.

Solution 1: The STA may perform sending in the manner 1 and the manner 2 at the same time. That is, the STA may simultaneously enable two backoff processes, one is used for CSMA/CA-based contention access, and the other is used for OFDMA contention-based contention access.

Solution 2: The STA performs sending in either of the manner 1 and the manner 2, and the STA determines to select the manner 1 or the manner 2.

Solution 3: The AP specifies the STA to perform sending in the manner 1 and/or the manner 2. That is, the AP sends a radio frame to the STA, the radio frame carries indication information, and the indication information is used to specify the STA to perform sending in the manner 1 or the manner 2 or both manners. The radio frame may be a beacon frame, an association response frame, or a re-association response frame. For example, the AP includes, in the beacon frame, indication information that indicates a sending manner of the STA, and the STA reads the beacon frame to obtain the sending manner, and sends an association request frame to the AP in the sending manner.

Embodiment 12

This embodiment proposes a transmission mode switching method. After obtaining a TXOP by obtaining a channel by means of contention in the CSMA/CA-based manner, a STA may send a radio frame to an AP and hand over the TXOP to the AP. The AP may initiate uplink multi-user transmission by using the TXOP and needs to schedule the STA in the uplink multi-user transmission. A specific process is as follows:

Step 1: The STA accesses a channel in the CSMA/CA-based contention access manner, and sends a radio frame to the AP after contention is successful, where the radio frame carries indication information, the indication information is used to indicate that the AP may instruct, after receiving the radio frame, the STA to perform uplink multi-user data transmission, and the AP needs to schedule the STA in the uplink multi-user transmission.

Step 2: After receiving the radio frame, the AP sends a trigger frame after a preset time, where the trigger frame carries scheduling information for triggering the STA to send a data frame (in addition, another STA may be triggered).

Step 3: The STA sends a radio frame according to the trigger information of the AP.

Step 4: The AP sends a multi-user block acknowledgement (English: multi-user block ACK, MBA for short) frame.

In addition, the STA may add indication information in the radio frame in step 3, so as to indicate whether the AP can continue to send another frame after sending the MBA in step 4. The another frame may be a trigger frame or a downlink data frame. If the indication information indicates that the AP can further continue to send another frame, after sending the MBA in step 4, the AP sends a radio frame after a preset time. The preset time may be a SIFS, and the radio frame may be a trigger frame or a downlink data frame. If the indication information indicates that the AP cannot continue to send another frame, after sending the MBA in step 4, the AP cannot send a radio frame. The STA may send a radio frame after a preset time, and the preset time may be a SIFS.

Embodiment 13

This embodiment provides a transmission mode switching method. After obtaining a TXOP by obtaining a channel by means of contention in the CSMA/CA-based contention access manner, a STA may send a radio frame to an AP, and the AP is allowed to schedule another STA to share the TXOP with the STA. A specific sharing manner may be an OFDMA manner or a multi-user MIMO manner. As an owner of the TXOP, the STA has a right to control whether a current TXOP is for multi-user transmission or single-user transmission, and control a transmission time of the single-user transmission or the multi-user transmission.

Figure 7:
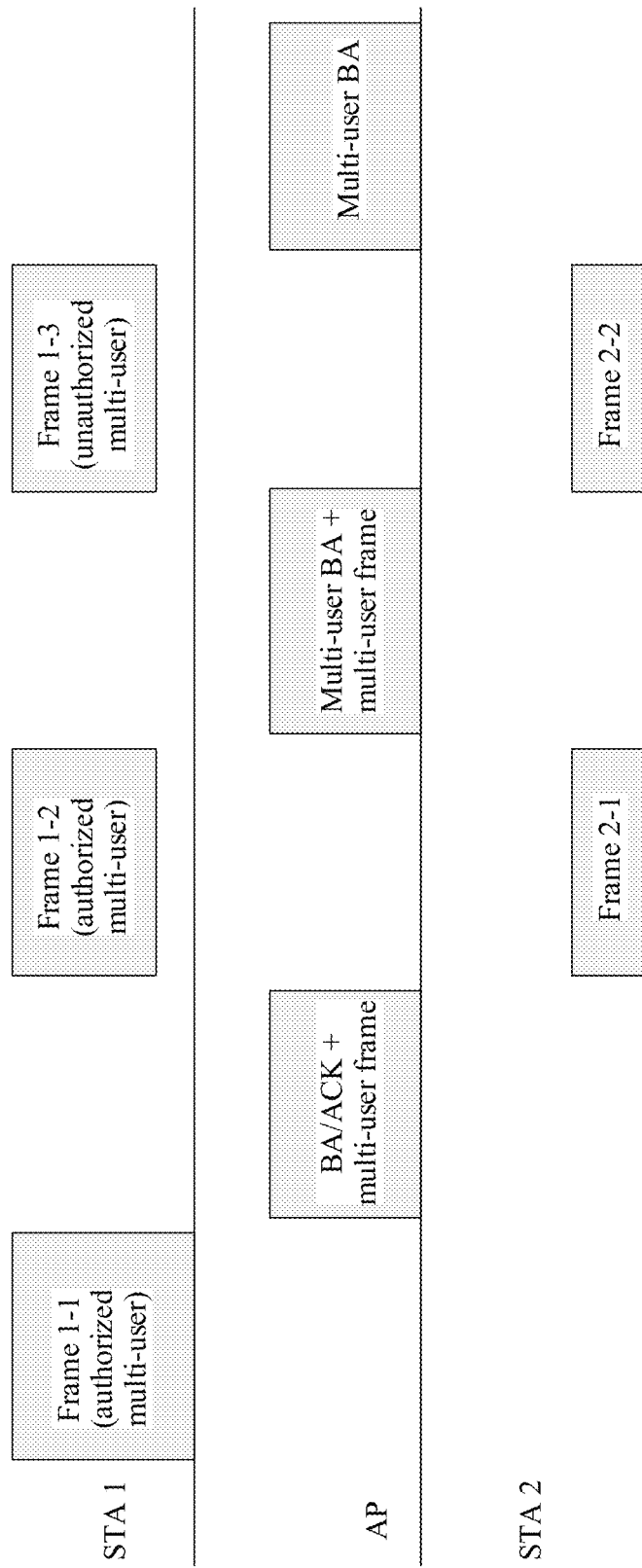
FIG. 7 is a schematic flowchart of a frame exchange of a transmission mode conversion method according to an embodiment.

As shown in FIG. 7, this embodiment provides a transmission mode switching method, including the following steps.

Step 1: A STA 1 sends, at a TXOP initiated by the STA 1, a first frame to an AP, where the first frame carries first indication information, and the first indication information is used to indicate that the AP may trigger uplink multi-user data transmission.

Step 2: After receiving the first frame of the STA 1, the AP sends a trigger frame after a preset time.

The trigger frame should carry scheduling information for triggering the STA to send a data frame (that is, ensuring that the STA is triggered while another STA may further be triggered). The scheduling information is used to: when an uplink multi-user MIMO (UL MU-MIMO) transmission manner is used, allocate a space-time stream to each uplink user; when an uplink orthogonal frequency division multiple access (UL OFDMA) transmission manner is used, allocate a frequency domain sub-band to each uplink user; and when the UL OFDMA and UL MU-MIMO transmission manners are used, allocate a frequency domain sub-band to each uplink user and a space-time stream of each user in the frequency domain sub-band.

The AP replies to the first frame (for example, sends an ACK frame or a Block ACK (BA) frame) before sending the trigger frame or at the same time when sending the trigger frame. Specifically, after the AP receives the first frame of the STA 1, a response frame replied by the AP may carry second indication information, and the second indication information is used to indicate whether the AP complies with an indication of the STA 1. That is, the AP may further use the second indication information to refuse to use UL MU transmission, and may reply to the first frame in a conventional manner.

Step 3: The STA 1 sends a second frame according to information carried in the trigger frame sent by the AP. The second frame is sent in a UL MU format. According to an indication of the trigger frame sent by the AP, the UL MU format may be a frame format of a user in UL OFDMA (that is, the second frame is located in a frequency domain sub-channel allocated by the AP), or may be a format of a user in UL MU-MIMO (that is, the second frame is located in a spatial flow/space-time stream allocated by the AP).

According to the indication of the trigger frame, in addition to the STA 1, another STA (for example, a STA 2) and the STA 1 both use the UL MU manner to send data to the AP.

Step 4: The AP sends a response frame, where the response frame simultaneously responds to data frames (or UL MU data frames) sent by multiple users. The response frame may be a multi-user block acknowledgement MBA (multi-user block ACK) frame or an acknowledgement (ACK/BA) frame carried in a DL MU (downlink multi-user) manner.

In addition, the STA may also add the first indication information in the second frame in step 3 to indicate whether the AP can continue to trigger UL MU transmission in subsequent transmission. In addition, when sending the response frame, the AP may choose to use the DL MU transmission manner to send data of more than one user to each user. Therefore, if the STA 1 is allowed to continue UL MU transmission in step 3, in step 4, the AP may respond to a multi-user data frame in step 3 by using an independent trigger frame, or may respond with information or a downlink multi-user data frame by using DL MU and carrying a trigger frame in the DL MU.

In this embodiment, if the first indication information in the frame sent by the STA 1 indicates that the AP cannot trigger UL MU transmission (unauthorized multi-user indicated by a frame 1-3 shown in FIG. 7), the AP cannot trigger UL MU transmission in a subsequently sent frame.

In this embodiment, transmission of the STA 1, the owner of the TXOP, determines a transmission length of the TXOP. Therefore, if transmission of the STA 1 ends, and an unauthorized AP continues using the TXOP, the STA 1 may send a contention free-end (English: Contention Free-End, CF-End for short) frame to end the TXOP. When the AP triggers more than one STA to send data by using UL MU, a data length of the STA 1 should be used as a reference of a transmission time, that is, transmission of another STA cannot exceed a transmission length of the STA 1.

The preset time in this embodiment may be a SIFS, or may be another fixed time, such as an SSIFS or PIFS. The first indication information in this embodiment is located in an HE control field, the second indication information may also be located in the HE control field, and an information bit of the first indication information may be even reused.

In addition, in this process, if the STA 2 indicates, in a frame that is in the UL MU format and that is sent by the STA 2, that data sending is not completed (for example, a more data bit is set to 1), the AP may indicate, in a subsequent trigger frame, that sending of some data is not completed (a specific form may be reusing the more data bit or may be using another dedicated information bit). As the owner of the TXOP, the STA 1 may consider the information to determine whether to continue to allow UL MU transmission. When the AP triggers UL MU transmission, the STA 1 may indicate, while indicating UL MU transmission authorization, information about a minimum resource allocated to the STA 1 in the authorized UL MU, so that the AP is prevented from allocating few resources to the STA 1, the owner of the TXOP. For example, if the AP triggers UL OFDMA transmission subsequently, the STA 1 may indicate that a minimum bandwidth allocated by the AP to the STA 1 cannot be less than 20 MHz.

Embodiment 14

This embodiment of the present invention may be applied to a scenario of multi-user uplink contention.

When a station has a to-be-sent data packet or the station sends a buffer size report and receives an acknowledgement frame replied by an AP, there are three cases: 1. If a trigger frame is received within an agreed time period, an OFDMA access manner (which may be the OFDMA contention access manner or the OFDMA scheduling access manner) is used to send data, or if no trigger frame is received within an agreed time period, the CSMA/CA-based contention access manner is used to send data. 2. A CSMA/CA-based contention access manner whose CW is relatively large is used within an agreed time period to send data, and a CSMA/CA-based contention access manner whose CW is relatively small is used after the agreed time period to send the data. 3. A size of a CW is decreased when an agreed time period ends.

From a target sending time point that is of a trigger frame and that is indicated by a beacon frame or a target sending time point that is of a trigger frame and that is negotiated by a station and an AP, there are three cases: 1. If a trigger frame is received within an agreed time period, an OFDMA access manner (which may be the OFDMA contention access manner or the OFDMA scheduling access manner) is used to send data, or if no trigger frame is received within an agreed time period, the CSMA/CA-based contention access manner is used to send data. 2. A CSMA/CA-based contention access manner whose CW is relatively large is used within an agreed time period to send data, and a CSMA/CA-based contention access manner whose CW is relatively small is used after the agreed time period to send the data. 3. A size of a CW is decreased when an agreed time period ends.

For the foregoing agreed time period, the station may set a timer to count the agreed time period. A channel access method 1 (for example, (if a trigger frame is received) the OFDMA access manner or the CSMA/CA-based contention access manner whose CW is relatively large) is used before the timer times out. A channel access method 2 (for example, (if a trigger frame is received) the OFDMA access manner or the CSMA/CA-based contention access manner whose CW is relatively small) is used after the timer times out. The timer is canceled after a trigger frame from the AP is received. Before the timer times out, one way is that the station delays contention or decreases intensity of contending for a channel by the station. In addition, when obtaining a channel by means of contention, the station may hand over a control right to the AP, and the AP sends a multi-user transmission trigger frame. The trigger frame may carry information about an uplink transmission resource.

The station uses, upon an event 1, an access manner that suppresses CSMA contention access. The station uses, upon an event 2, a manner that promotes CSMA contention access. The access manner that suppresses CSMA contention access includes: to increase a contention window parameter of CSMA contention access, or to stop backoff number updating of CSMA contention access, or to disable CSMA contention access. The access manner that promotes CSMA contention access includes: to decrease a contention window parameter of CSMA contention access, or to resume/start backoff number updating of CSMA contention access, or to enable CSMA contention access.

The event 1 may be that the station has a to-be-sent data packet or the station sends a buffer size report and receives an acknowledgement frame replied by the AP, or the like. The event 2 may be that the timer times out and no trigger frame sent by the AP is received, or the like. The AP provides an event indication, and the event indication is used to (explicitly or implicitly) indicate the station to use a channel access manner. For example, the event indication may be the information about the uplink transmission resource carried in the trigger frame sent by the AP.

Embodiment 15

Figure 8:
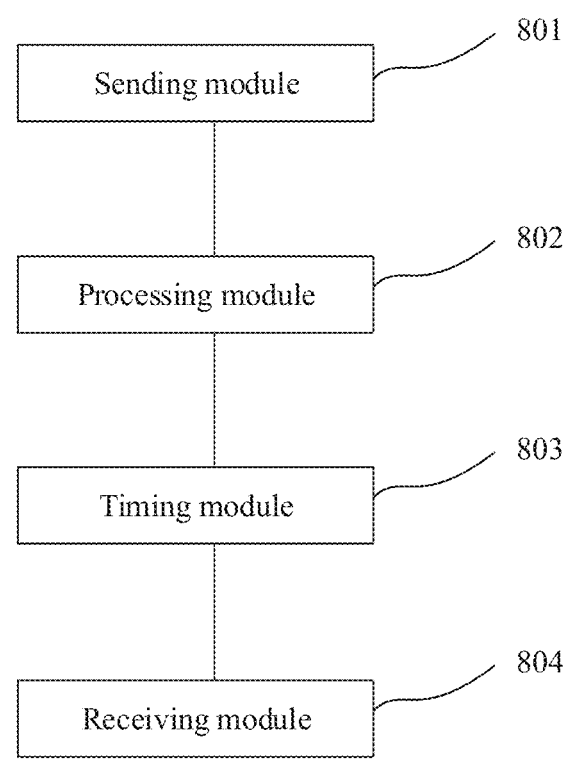
FIG. 8 shows an access apparatus according to an embodiment of the present invention.

FIG. 8 shows an access apparatus according to an embodiment of the present invention. As shown in FIG. 8, this embodiment provides an access apparatus, including:

a sending module 801, configured to send, to an access point, a first frame that carries uplink transmission requirement information; and a processing module 802, configured to: if a second frame that carries information about an uplink transmission resource is received from the access point within an agreed time period, send uplink multi-user transmission data to the access point, where the uplink multi-user transmission data is transmitted on the uplink transmission resource; or if the second frame is not received within an agreed time period, access, by a station, a channel in a contention access manner that is based on carrier sense CSMA/CA.

Optionally, the access apparatus further includes a timing module 803, configured to count the agreed time period by using a timer, where an initial value of the timer is specified by the access point or is agreed in a protocol.

Optionally, the access apparatus further includes a receiving module 804, configured to receive a radio frame sent by the access point, where the radio frame indicates sending time of the second frame, and the radio frame is an association response frame, a beacon frame, or a response frame of the access point to a received data frame.

Some technical features in the foregoing apparatus embodiment, such as an access manner, the timer, or other further descriptions (such as a trigger frame), are similar or corresponding to some technical features in the foregoing method embodiments, and no repeated descriptions are given herein.

In addition, corresponding to the foregoing method, an embodiment of the present invention further provides an access apparatus. The apparatus includes a memory and a processor, the memory is configured to store an instruction required by the processor for execution, and the processor is configured to execute the method in the foregoing embodiments. In addition, the apparatus may further include a transmitter and a receiver that are respectively configured to send and receive data.

According to the embodiments of the present invention, such as descriptions herein, although the present invention is described in specific embodiments, it should be understood that the present invention should not be interpreted as being limited to these embodiments, but is explained according to the claims.

What is claimed is:

1. A communication method, comprising:
receiving, by a station from an access point, a radio frame carrying indication information to indicate an access manner of the station, wherein the indication information includes a first indicator and a second indicator, each of the first indicator and the second indicator corresponds to a different access manner, the first indicator indicating whether a carrier sense multiple access with collision avoidance (CSMA/CA) based contention access manner is enabled and the second indicator indicating whether an orthogonal frequency division multiple access (OFDMA) based contention access manner is enabled, wherein the CSMA/CA based contention access manner is disabled or enabled based on whether congestion occurs or not, and wherein the OFDMA based contention access manner is enabled or disabled based on whether congestion occurs or not; and
accessing, by the station, the access point according to the radio frame.

2. The communication method according to claim 1, wherein the radio frame is a beacon frame or an association response frame.

3. The communication method according to claim 1, wherein the accessing, by the station, the access point according to the radio frame, comprises:
when both of the CSMA/CA based contention access manner and the OFDMA based contention access manner are disabled, using an OFDMA based scheduling access manner to access the access point.

4. The communication method according to claim 1, before receiving the radio frame, the method further comprises:
using an OFDMA-based scheduling access manner to access the access point.

5. The communication method according to claim 4, wherein the station uses the OFDMA-based scheduling access manner to access the access point within a time period, and both of the CSMA/CA based contention access manner and the OFDMA based contention access manner are disabled within the time period.

6. The communication method according to claim 4, wherein the station uses the OFDMA-based scheduling access manner to access the access point, and the method further comprises:
receiving, by the station, a trigger frame carrying channel information; and
performing, by the station, data transmission on a corresponding channel according to the channel information.

7. A communication method, comprising:
generating, by an access point, a radio frame carrying indication information to indicate an access manner of a station, wherein the indication information includes a first indicator and a second indicator, each of the first indicator and the second indicator corresponds to a different access manner, the first indicator indicating whether a carrier sense multiple access with collision avoidance (CSMA/CA)based contention access manner is enabled and the second indicator indicating whether an orthogonal frequency division multiple access (OFDMA) based contention access manner is enabled, wherein the CSMA/CA based contention access manner is disabled or enabled based on whether congestion occurs or not, and wherein the OFDMA based contention access manner is enabled or disabled based on whether congestion occurs or not; and sending, by the access point, the radio frame.

8. The communication method according to claim 7, wherein the radio frame is a beacon frame or an association response frame.

9. The communication method according to claim 8, wherein the radio frame is a beacon frame, and the beacon frame further includes an identifier of one or more stations.

10. The communication method according to claim 7, the method further comprising:
when both of the CSMA/CA based contention access manner and the OFDMA based contention access manner are disabled, sending, by the access point, a trigger frame carrying channel information.

11. A communication apparatus, comprising:
a receiver, configured to receive a radio frame carrying indication information to indicate an access manner of a station, wherein the indication information includes a first indicator and a second indicator, each of the first indicator and the second indicator corresponds to a different access manner, the first indicator indicating whether a carrier sense multiple access with collision avoidance (CSMA/CA) based contention access manner is enabled and the second indicator indicating whether an orthogonal frequency division multiple access (OFDMA) based contention access manner is enabled, wherein the CSMA/CA based contention access manner is disabled or enabled based on whether congestion occurs or not, and wherein the OFDMA based contention access manner is enabled or disabled based on whether congestion occurs or not; and
a transmitter communicatively coupled with the receiver, wherein the transmitter is configured to access an access point according to the radio frame.

12. The communication apparatus according to claim 11, wherein the radio frame is a beacon frame or an association response frame.

13. The communication apparatus according to claim 11, wherein the transmitter is configured to:
when both of the CSMA/CA based contention access manner and the OFDMA based contention access manner are disabled, access the access point using an OFDMA based scheduling access manner.

14. The communication apparatus according to claim 11, wherein, before receiving the radio frame, the transmitter is configured to access the access point using an OFDMA-based scheduling access manner.

15. The communication apparatus according to claim 14, wherein the transmitter is configured to access the access point by using the OFDMA-based scheduling access manner within a time period, and both of the CSMA/CA based contention access manner and the OFDMA based contention access manner are disabled within the time period.

16. The communication apparatus according to claim 14, wherein
the receiver is configured to receive a trigger frame carrying channel information; and
the transmitter is configured to perform data transmission on a corresponding channel according to the channel information.

17. A communication apparatus, comprising:
at least one processor; and
one or more memories coupled to the at least one processor and storing programming instructions for execution by the at least one processor to cause the apparatus to:
generate a radio frame carrying indication information to indicate an access manner of a station, wherein the indication information includes a first indicator and a second indicator, each of the first indicator and the second indicator corresponds to a different access manner, the first indicator indicating whether a carrier sense multiple access with collision avoidance (CSMA/CA) based contention access manner is enabled and the second indicator indicating whether an orthogonal frequency division multiple access (OFDMA) based contention access manner is enabled, wherein the CSMA/CA based contention access manner is disabled or enabled based on whether congestion occurs or not, and wherein the OFDMA based contention access manner is enabled or disabled based on whether congestion occurs or not; and
a transmitter communicatively coupled with the at least one processor, wherein the transmitter is configured to send the radio frame.

18. The communication apparatus according to claim 17, wherein the radio frame is a beacon frame or an association response frame.

19. The communication apparatus according to claim 18, wherein the radio frame is a beacon frame, and the beacon frame further includes an identifier of one or more stations.

20. The communication apparatus according to claim 17, wherein, when both of the CSMA/CA based contention access manner and the OFDMA based contention access manner are disabled, the transmitter is configured to send a trigger frame carrying channel information.

* * * * *

UNITED STATES PATENT AND TRADEMARK OFFICE
CERTIFICATE OF CORRECTION

PATENT NO. : 11,324,044 B2
APPLICATION NO. : 16/371787
DATED : May 3, 2022
INVENTOR(S) : Yanchun Li et al.

It is certified that error appears in the above-identified patent and that said Letters Patent is hereby corrected as shown below:

In the Claims

Column 27/Line 5 – In Claim 7, delete "(CSMA/CA)based" and insert -- (CSMA/CA) based --.

Signed and Sealed this
Eleventh Day of October, 2022

Katherine Kelly Vidal
*Director of the United States Patent and Trademark Office*